United States Patent [19]
Greiff et al.

[11] Patent Number: 5,505,084
[45] Date of Patent: Apr. 9, 1996

[54] MICROMECHANICAL TUNING FORK ANGULAR RATE SENSOR

[75] Inventors: Paul Greiff, Wayland; Burton Boxenhorn, Chestnut Hill, both of Mass.

[73] Assignee: The Charles Stark Draper Laboratory, Inc., Cambridge, Mass.

[21] Appl. No.: 212,320

[22] Filed: Mar. 14, 1994

Related U.S. Application Data

[63] Continuation of Ser. No. 757,706, Sep. 11, 1991, abandoned.

[51] Int. Cl.$^6$ .................................................... G01P 9/04
[52] U.S. Cl. ............................................................. 73/504.14
[58] Field of Search ........................................ 73/505, 510

[56] References Cited

U.S. PATENT DOCUMENTS

Re. 32,931  5/1989  Staudte ........................................ 73/505

(List continued on next page.)

FOREIGN PATENT DOCUMENTS 55-121728  9/1980  Japan .

(List continued on next page.)

OTHER PUBLICATIONS

Barth, P. W. et al., "A Monolithic Silicon Accelerometer With Integral Air Damping and Overrange Protection," *1988 IEEE, pp. 35–38*.
Boxenhorn, B., et al., "An Electrostatically Rebalanced Micromechanical Acceleromter," AIAA guidance, Navigation and Control Conference, Boston, Aug. 14–16, 1989, pp. 118–122.
Boxenhorn, B., et al., "Micromechanical Inertial Guidance System and its Application," fourteenth Biennial Guidance Test Symposium, vol. 1, Oct. 3–5, 1989, pp. 113–131.
Boxenhorn, B., et al., "Monolithic Silicon Accelerometer," *Transducers '89*, Jun. 25–30, 1989, pp. 273–277.
Boxenhorn, B., et al., "Vibratory Micromechanical Gyroscope," AIAA Guidance, Navigation and control Conference, Minneapolis, Aug. 15–17, 1988, pp. 1033–1040.
Howe, R., et al., "Silicon micromechanics: Sensors and Actuators On a Chip," IEEE Spectrum, Jul. 1990, pp. 29–35.
Moskalik, L., "Tensometric Accelerometers with Overload Protection," Meas. Tech (USA), vol. 22, No. 12, Dec. 1979 (publ. May/80), pp. 1469–1471.
Nakamura, M., et al., "Novel Electrochemical Micro–Machining and Its Application for Semiconductor Acceleration Sensor IC," *Digest of Technical Papers* (1987) Institute of Electrical Engineers of Japan, pp. 112–115.
Petersen, K. E. et al., "Micromechanical Accelerometer Integrated with MOS Detection Circuitry," IEEE, vol. ED–29, No. 1 (Jan. 1982), pp. 23–27.
Petersen, Kurt E., et al., "Silicon as a Mechanical Material," *Proceedings of the IEEE*, vol. 70, No. 5, May 1982, pp. 420–457.
"Quartz Rate Sensor Replaces Gyros," *Defense Electronics*, Nov. 1984, p. 177.
Rosen, Jerome, "Machining In athe Micro Domain," *Mechanical Engineering*, Mar. 1989, pp. 40–46.
Teknekron Sensor Development Corporation, article entitled "Micro–Vibratory Rate Sensor," 1080 Marsh Road, Menlo Park, Calif. 94025, 2 pages, undated.

*Primary Examiner*—John E. Chapman
*Attorney, Agent, or Firm*—Weingarten, Schurgin, Gagnebin & Hayes

[57] ABSTRACT

A, micromechanical tuning fork gyroscope is fabricated from a unitary silicon substrate utilizing etch stop diffusions and selective anisotropic etching. A silicon structure is suspended over the selectively etched pit. The silicon structure includes at least first and second vibratable structures. Each vibratable structure is energizable to vibrate laterally along an axis normal to the rotation sensitive axis. The lateral vibration of the first and second vibratable structures effects simultaneous vertical movement of at least a portion of the silicon structure upon the occurrence of angular rotation of the gyroscope about the rotation sensitive axis. The vertical movement of the silicon structure is sensed, and a voltage proportional to the movement is generated, for providing an indication of angular rate of rotation detected by the gyroscope.

39 Claims, 13 Drawing Sheets

U.S. PATENT DOCUMENTS

| | | | |
|---|---|---|---|
| Re. 33,479 | 12/1990 | Juptner et al. | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 8/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda et al. | 365/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,674,331 | 6/1987 | Watson | 73/505 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,858,083 | 4/1986 | Nishiguchi | 177/229 |
| 4,869,107 | 9/1989 | Murakami | 73/517 R |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Herion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,016,072 | 5/1991 | Greiff | 73/505 |
| 5,025,346 | 6/1991 | Tang et al. | 361/283 |
| 5,038,613 | 8/1991 | Takenaka et al. | 73/510 |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,205,171 | 4/1993 | O'Brien et al. | 73/517 B |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |

FOREIGN PATENT DOCUMENTS

| | | |
|---|---|---|
| 58-136125 | 8/1983 | Japan . |
| 59-037722 | 3/1984 | Japan . |
| 59-158566 | 9/1984 | Japan . |
| 61-144576 | 7/1986 | Japan . |
| 62-071256 | 8/1987 | Japan . |
| 62-221164 | 9/1987 | Japan . |
| 63-169078 | 7/1988 | Japan . |
| 2183040 | 5/1987 | United Kingdom . |

ALL INSTRUMENTS WILL HAVE THEIR OWN BUFFER AMPLIFIER

IPG = IN PLANE GYRO
OPG = OUT OF PLANE GYRO (CURRENT INSTRUMENT)
IPA = IN PLANE ACCELEROMETER (COULD ALSO USE VIBRATORY STRING TYPE)
OPA = OUT OF PLANE ACCELEROMETER (CURRENT INSTRUMENT)

5,505,084

MICROMECHANICAL TUNING FORK ANGULAR RATE SENSOR

This application is a continuation of application Ser. No. 07/757,706, filed Sep. 11, 1991, abandoned.

FIELD OF THE INVENTION

This invention relates to angular rate sensors such as gyroscopes, and more particularly, to a micromachined tuning fork angular rate sensor fabricated from a unitary silicon substrate.

BACKGROUND OF THE INVENTION

Angular rate sensors such as gyroscopes serve as one of the major sensors in inertial navigation and guidance systems. Traditionally, gyroscopes have been implemented as large mechanical devices such as rotating wheel gyroscopes or other large metallic devices with dimensions of inches. These types of devices have several drawbacks including size restriction, reliability concerns due to the large number of mechanical parts, and high costs associated with precise machine tolerances and tuning.

The use of tuning forks for gyroscopes has been attempted but has been met with limited success. These devices are costly due in part to the effort required to tune the motor resonant frequency to the output resonant frequency and also in part due to the large size of such devices. Thus, large scale production of these types of devices have not proven commercially viable.

In addition, prior art tuning fork gyroscopes have not been able to separate or isolate the drive axis from the sense axis, leading to causing more difficult and complicated manufacturing techniques.

Although a number of attempts have been made to produce solid state, micromachined tuning fork gyroscopes, the prior art devices are made of quartz and still generally of intermediate size. In addition, precision fabrication and assembly techniques as well as assembly costs have limited the success of such devices.

SUMMARY OF THE INVENTION

This invention features a double tined, micromechanical tuning fork gyroscope, for detecting angular rotation about at least one rotation sensitive (sense) axis. Such a gyroscope is fabricated from a unitary silicon substrate in which has been selectively etched a pit over which is suspended a silicon structure.

The silicon structure is disposed within a first plane and includes at least first and second vibratable structures. The first and second vibratable structures are disposed generally adjacent and parallel to one another. Each of the first and second vibratable structures includes a mass integral with an associated vibratable structure.

In one embodiment, the silicon structure is suspended over the etched pit by first and second flexible elements which are disposed generally co-linear with the rotation sensitive axis of the gyroscope, for allowing the silicon structure to rotate about the rotation sensitive axis.

The silicon structure may be divided into at least two electrically isolated yet structurally coupled segments. Each segment includes one vibratable structure. The vibratable structures are energizable, in response to an applied voltage, to vibrate in a resonant or non-resonant mode parallel to a motor or drive axis oriented orthogonal to the sense axis.

Drive means energize the first and second vibratable structures to vibrate laterally, parallel to an axis normal to the rotation sensitive axis. Lateral vibration of the vibratable structures effects vertical or rotational movement of at least a portion of the silicon structure about the rotation sensitive axis upon the occurrence of angular rotation of the gyroscope about the rotation sensitive axis. Means for sensing rotation of the silicon structure are provided, for sensing vertical or rotational movement of the silicon structure, and for providing a voltage proportional to the rotational movement occurring in the silicon structure, for generating an indication of the angular rate of rotation detected by the tuning fork gyroscope.

DESCRIPTION OF THE DRAWINGS

These, and other features and advantages of the present invention will be better understood by reading the following detailed description taken together with the drawings, wherein.

DETAILED DESCRIPTION OF THE INVENTION

Figure 1:
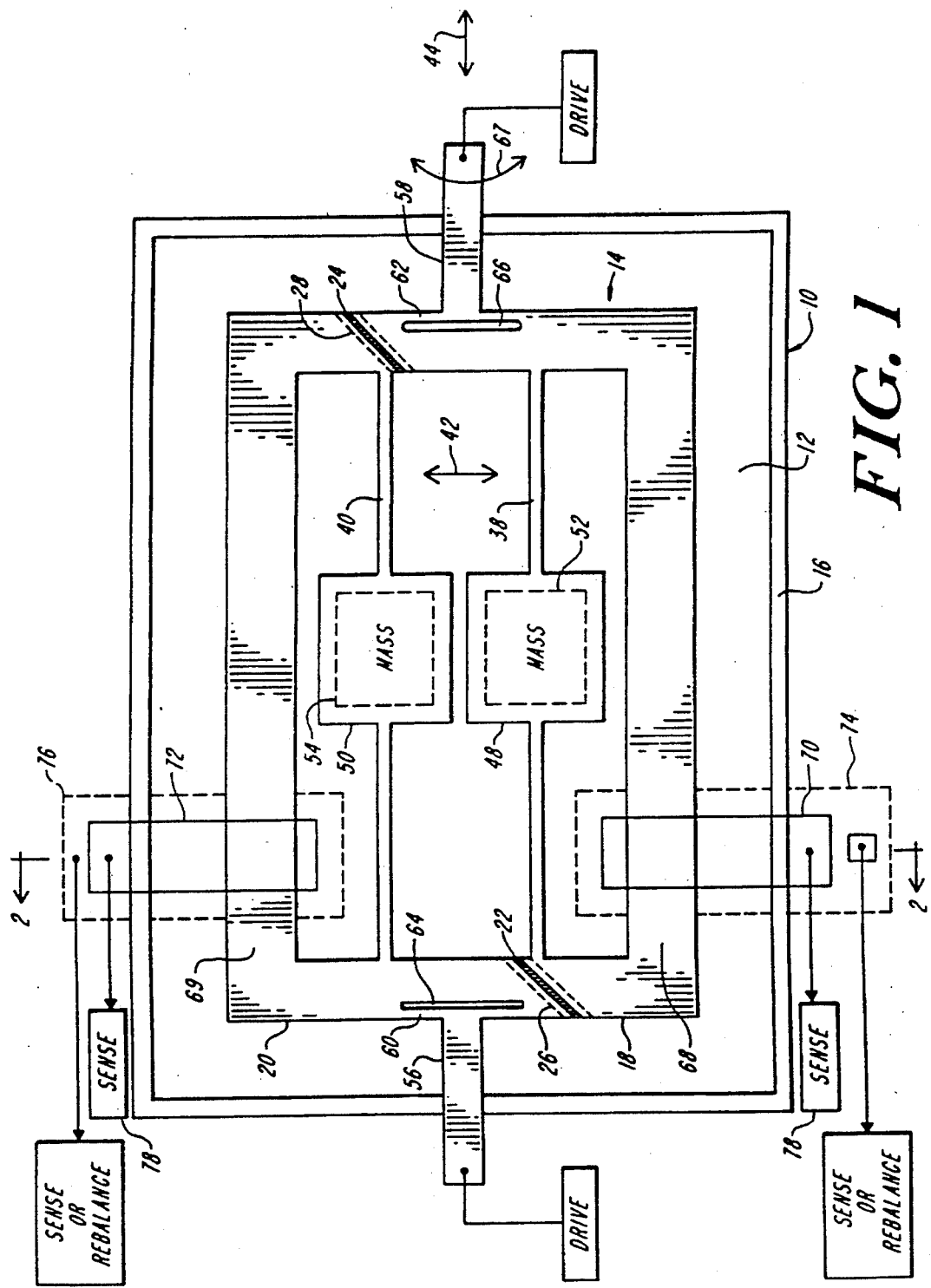
FIG. 1 is a top view of a schematic representation of a double-tined, pivoting, closed-end tuning fork gyroscope according to one embodiment of the present invention.

There is shown in FIG. 1 a double-tined, pivoting, closed-end tuning fork gyroscope according to one embodiment of the present invention. The tuning fork gyroscope is micromachined from a unitary silicon substrate 10 employing the techniques of selective oxide removal, boron diffusions into the substrate through the removed oxide regions, and anisotropic etching. Such methods are known in the art and are further described herein and are also disclosed in Applicant's co-pending U.S. patent application Ser. No. 143,515 entitled "Method and Apparatus for Semi-Conductor Chip Transducer" which is incorporated herein by reference.

The etch stop diffusions and subsequent selective anisotropic etching create etch pit 12 having sloped sidewalls 16. Suspended over etched pit 12 is a silicon structure 14 that remains after etching.

The silicon structure 14 includes at least first and second segments 18 and 20. First and second segments 18 and 20 are electrically isolated from one another by means of isolation gaps 22 and 24. The segments are structurally coupled by means of dielectric lap joints 26 and 28 (shown in dashed lines) which bridge the isolation gaps thereby structurally coupling the segments together while retaining electrical isolation.

The silicon structure 14 further includes first and second vibratable structures 38 and 40. The first and second vibratable structures 38 and 40 form the two "tines" or "forks" of the tuning fork gyroscope according to the present invention.

The first vibratable structure 38 is coupled to first segment 18 of the silicon structure, while the second vibratable structure 40 is coupled to the second segment 20 of the silicon structure. Thus, the two vibratable structures are electrically isolated from one another. The first and second vibratable structures 38 and 40 are energizable to vibrate in a resonant mode, and may be driven electrostatically or electromagnetically against each other parallel to an axis indicated by arrow 42 which is normal to the rotation sensitive or input axis of the gyroscope indicated by arrow 44. Excitation or drive signals, described in greater detail below, drive the two vibratable structures parallel to axis 42 by applying a sinusoidal voltage of opposite polarity to each of the structures.

For improved performance, however, it may be desirable to add additional mass at an appropriate location on the vibratable structures. This location is usually at the center of a closed-end tuning fork and at the end of an open-ended tuning fork. Typically, the mass should be symmetrical about the plane of motion to avoid unwanted torques on the gyroscope structure.

The oscillating or vibrating inertia of first and second vibratable structures 38 and 40 may thus be enhanced by adding masses 48 and 50 to the first and second vibratable structures respectively. Masses 48 and 50 are formed from silicon along with the silicon structure 14 by selective doping and subsequent anisotropic etching. Sensitivity of the gyroscope may be further enhanced by adding additional weight to masses 48 and 50 by plating gold, lead or a similar metal of high density. These metals and other high density metals may also be deposited by chemical vapor deposition proximate or within tub regions 52 and 54 formed in masses 48 and 50. By properly selecting the height of the plating and the area to be plated above the plane of the silicon structure, the center of gravity of the vibratable structures may be positioned within the plane of the flexures, thus balancing the masses about the plane of motion.

An important feature of the micromechanical tuning fork gyroscope of the present invention is the ease of fabricating such a device from a single unitary silicon substrate. Utilizing conventional well known photolithography techniques applied to the surface plane of the wafer, great precision in locating the mass may be obtained.

In one nominal design, the silicon structure 14 measures approximately 800 microns in length by 500 microns in width, while masses 48 and 50 are approximately 80 microns wide by 50 microns long by 15 microns high, and weigh approximately $1.2 \times 10^{-9}$ kg.

The first and second vibratable structures or forks are provided with enhanced flexibility in the direction parallel to axis 42 by choosing their geometry to include a high height-to-width ratio. In one design, each vibratable structure is approximately 4 microns wide by 15 microns high by 700 microns long. A gap of approximately 4 microns separates the two vibratable structures at their closest point.

The silicon structure 14 is suspended over etched pit 12 by means of flexible elements or pivots 56 and 58. One end of each of the flexible elements 56 and 58 is attached to diametrically opposing sides of the silicon structure 14. The flexible elements are disposed generally co-linear with rotation sensitive or input axis 44. The second end of each of the flexible elements remains integral with silicon substrate 10. The flexible elements are typically doped with a P-type dopant for etch resistance, and are therefore electrically isolated from the N-type silicon substrate 10 by means of a PN junction which is formed between the P-doped flexible elements and the N type silicon substrate.

The boron diffusion used to define the silicon structure and the subsequent process of etching the surrounding silicon causes shrinking in the silicon lattice that creates a high tensile force in the flexible elements. Accordingly, tension relief beams 60 and 62 disposed proximate the first end of flexible elements 56 and 58 are formed by openings 64 and 66 in the non-etched silicon structure. Tension relief beams 60 and 62 serve to relieve the stress caused by the high tensile forces by allowing the tension relief beams to deflect or bow slightly, thereby reducing the torsional stiffness of flexible elements 56 and 58 and thus increasing the rotational sensitivity of silicon structure 14.

Tension relief beams and various embodiments thereof and a method for trimming the resonant frequency of a structure employing tension relief beams are described in greater detail in co-pending U.S. patent application Ser. No. 470,938 entitled "MICROMECHANICAL DEVICE WITH A TRIMMABLE RESONANT FREQUENCY STRUCTURE AND METHOD OF TRIMMING SAME" assigned to the assignee of the present invention, and which is incorporated herein by reference. Additionally, although first and second tension relief beams 60 and 62 are shown in this embodiment, only one tension relief beam is required to relieve the stress created by the high tensile forces in the flexures.

During operation of the gyroscope of the present invention, any angular rotation of the gyroscope about rotation sensitive axis 44 imparts an out-of-plane motion perpendicular to the laterally vibrating structures 38 and 40. This motion produces a torsional motion in silicon structure or plate 14, effecting an oscillatory rotational movement of the silicon structure about the rotation sensitive axis 44 as shown by arrow 67. The outer regions 68 end 69 of the silicon structure 14 serve as "sense regions" of the gyroscope for detecting rotational motion resulting from an input angular rate. These "sense regions" may be thinner than the rest of the structure or alternatively, may include a "waffle" type construction, to minimize unwanted inertia effects.

In one embodiment, rotational sensing of the silicon structure 14 about the rotation sensitive axis 44 is accomplished utilizing bridge sense electrodes 70 and 72, although sensing and closed-loop rebalancing of the silicon structure 14 utilizing buried sense electrodes 74 and 76 is also contemplated by the present invention. Bridge electrodes 70 and 72 extend from silicon substrate 10, over etched pit 12 and continue extending over the silicon structure in the area of outer regions 68 and 69.

Typically, the bridge electrodes 70 and 72 are spaced approximately 2 to 10 microns above the silicon structure. The bridge electrodes are coupled to electrostatic sense electronics 78 which measure the amount of rotation of the silicon structure by sensing the differential capacitance between the sense electrodes and the adjacent silicon structure. Sense electronics 78, described in greater detail below, as well as drive and rebalance electronics may be formed on the silicon substrate adjacent to the tuning fork gyroscope of the present invention, or alternatively, may be located remotely from the gyroscope.

Figure 2:
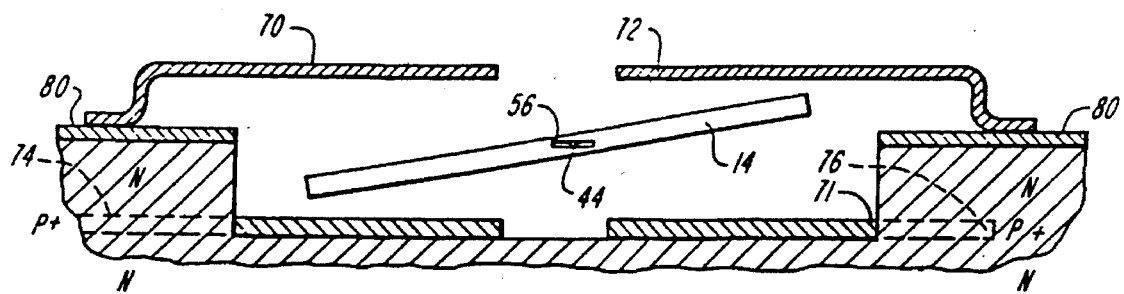
FIG. 2 is a cross-sectional view of the gyroscope of FIG. 1 taken along lines 2—2.

The torsional rotation imparted onto the pivoting silicon structure 14 upon the occurrence of an angular rate input about rotation sensitive axis 44 is shown in greater detail in FIG. 2 wherein is shown flexible element 56 co-linear with rotation sensitive axis 44. Silicon structure 14 is torsionally displaced away from bridge sense electrode 70 and nearer to bridge sense electrode 72 upon the occurrence of angular rotation about rotation sensitive axis 44. Before forming the bridge electrodes, the planar surface of the silicon substrate 10 is thermally oxidized to form a dielectric layer 80 which electrically isolates the bridge electrodes from the substrate. One or more P+ doped buried electrodes such as electrodes 74 and 76 may be provided.

Figure 3:
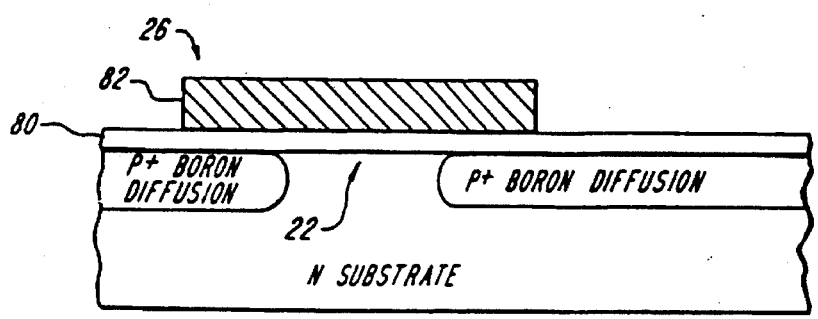
FIG. 3 is an enlarged view of the electrical isolation gap and dielectric lap joint according to the present invention.

A portion of the double tined, closed-end micromechanical tuning fork gyroscope of the present invention is shown in greater detail in the cross-section of FIG. 3 wherein is more clearly illustrated electrical isolation gap 22 which serves to electrically isolate first silicon structure segment 18 and the attached first vibratable structure 38, from the second silicon structure segment 20 and the attached second vibratable structure 40. Electrical isolation gap 22 is formed by an intentional gap in the boron diffusion pattern utilized to form the silicon structure.

After the boron diffusion step but prior to anisotropic etch, dielectric lap joint 26 is formed over the electrical isolation slot by first depositing a layer of silicon nitride 80 of approximately 0.2 to 2.0 microns in thickness. Subsequently, a layer of silicon dioxide 82 of from 0.5 to 5 microns in thickness may be applied over the silicon nitride layer to stiffen the dielectric lap joint. By minimizing the width of the electrical isolation gap 22 to approximately 5 microns or less in the underlying silicon structure, and by applying dielectric lap joint 26, a rigid and structurally coupled but electrically isolated silicon structure results. The subsequent process of anisotropic etching undercuts the silicon structure forming the electrical isolation gap 22.

Figure 4A:
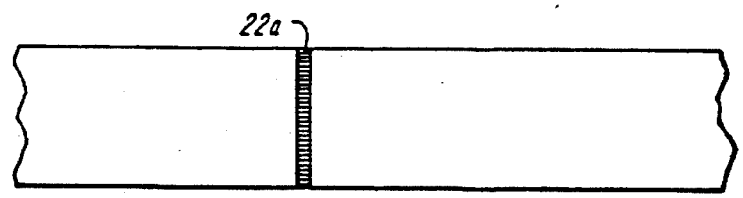
FIGS. 4A—4C are top views of alternative designs for the isolation gap of the gyroscope according to the present invention.
Figure 4B:
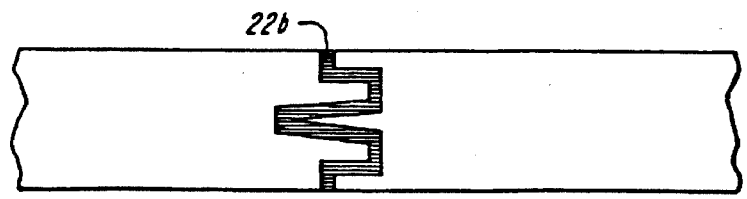
Figure 4C:
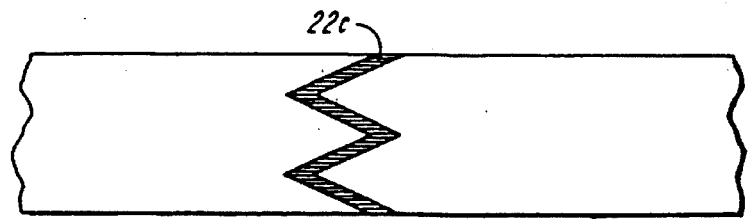

As shown in FIG. 1, isolation gap 22 is a diagonal gap in the silicon structure 14. The tuning fork gyroscope of the present invention also contemplates other embodiments of the gap including a straight gap 22a shown in FIG. 4A, and the undulating and non-straight isolation gaps 22b and 22c shown in FIGS. 4B and 4C, which provide greater resistance to bending than does gap 22a.

Figure 5:
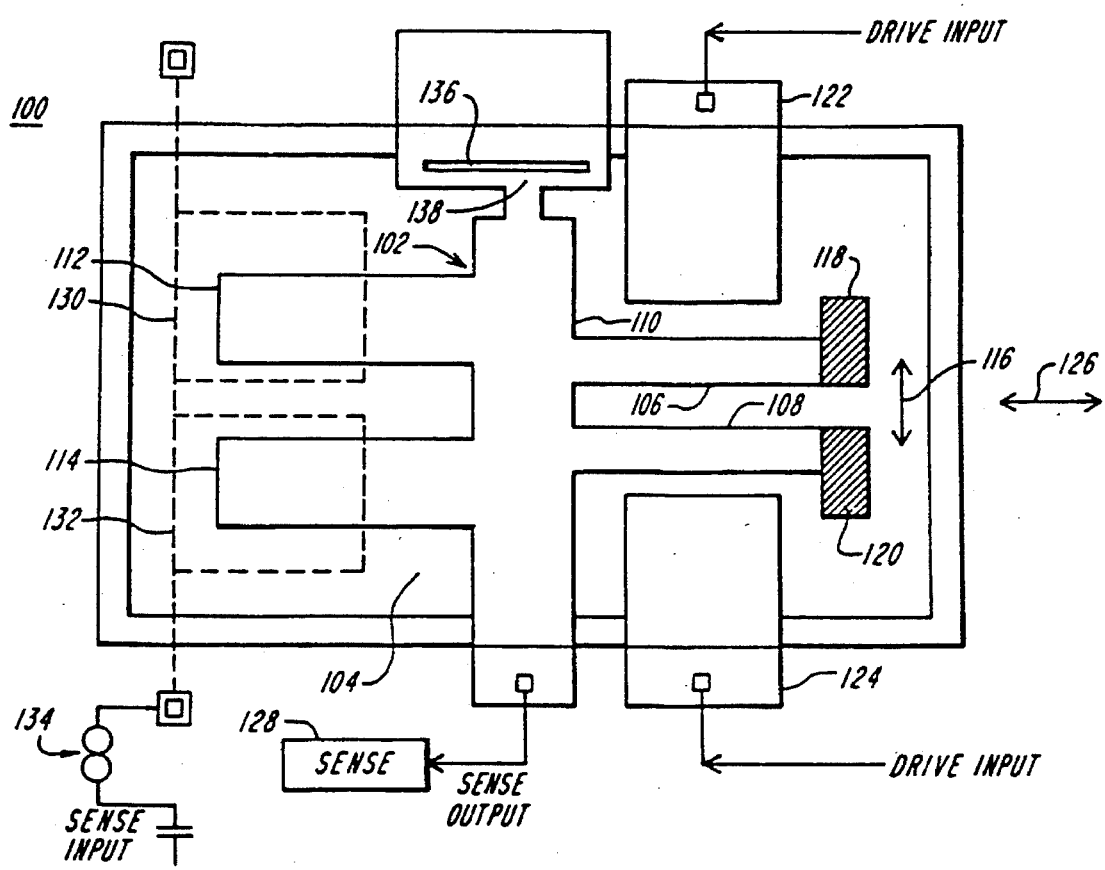
FIG. 5 is a top view of a schematic representation of an open-ended tuning fork according to another embodiment of the present invention.

An additional embodiment of a tuning fork gyroscope according to the present invention is shown in FIG. 5 wherein is illustrated an open-ended tuning fork fabricated from a unitary silicon substrate. The gyroscope 100 includes a silicon structure 102 suspended over an etched pit 104 anisotropically etched from the silicon wafer.

Silicon structure 102 includes first and second vibratable structures or forks 106 and 108 coupled to a rigid connecting segment 110. A second pair of vibratable structures or forks 112 and 114 are also coupled to rigid connecting segment 110.

The first and second vibratable structures 106, 108 and rigid central connecting segment 110 are formed by relatively deep Boron diffusions yielding structures with a height-to-width ratio of greater than 1. This high height-to-width ratio gives the first and second vibratable structures 106, 108 a preferred oscillation in a direction of arrow 116. In addition, performance of the gyroscope according to this embodiment may be enhanced by providing masses 118 and 120 at the ends or tips of the vibratable structures 106, 108 respectively.

Applying a drive input voltage to protruding cantilevered electrodes 122 and 124 will cause the first and second vibratable structures 106, 108 to vibrate in a direction of arrow 116. Electrodes 122 and 124 are formed by the same diffusion that is used to form structure 110. In response to angular rotation about input axis 126, an oscillatory torque will be applied to the rigid central segment 110. This oscillatory torque will cause the second pair of vibratable structures 112, 114, having a low height-to-width ratio, to resonate in a vertical direction, perpendicular to the plane of the device and perpendicular to the lateral oscillation in a direction of arrow 116 of the first and second vibratable structures 106, 108.

The amplitude of the oscillation in the second set of vibratable structures 112, 114 is proportional to the angular rate, and is sensed by sense electronics 128 by applying a high frequency out-of-phase signal from sense input 134 to vibratable structures 112, 114 through buried electrodes 130, 132.

The structure may also include at least one opening 136 which forms tension relief beam 138 for relieving stress due to the Boron diffusions. Further, since the semiconductor material is N type and the silicon structure 102 and bridge electrodes 122, 124 are P type, all structures are electrically isolated from the body of the silicon wafer by the PN junction formed between the P type structure and the N type silicon wafer.

Figure 6:
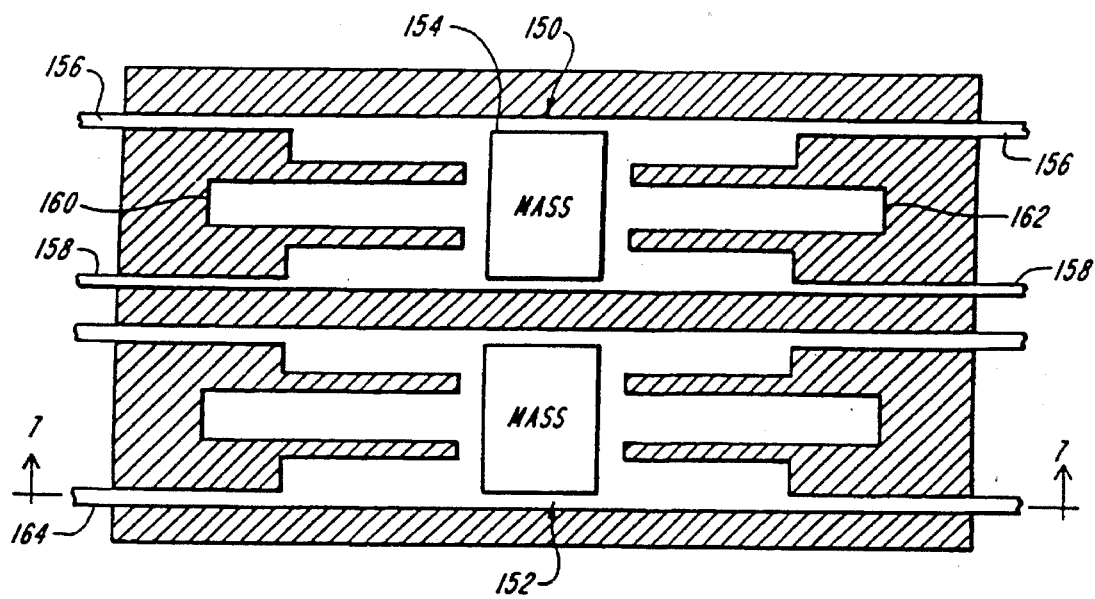
FIG. 6 is a top view of a schematic representation of a non-pivoting tuning fork gyroscope according to yet another embodiment of the present invention.

An additional embodiment of a positioning micromechanical tuning fork gyroscope according to the present invention is shown in FIG. 6 and includes, among other elements, first and second vibratable structures 150 and 152. Each vibratable structure includes a mass such as mass 154 coupled to first and second beams 156 and 158. The mass and attached beams vibrate as an entity with the beams operating as springs, which avoids the problem of the mass not being perfectly centered about the vibrating beam and thereby causing unwanted torques. In the case of a non-pivoting structure, the mass is disposed about the center of the tine. For readout purposes, bridge electrodes (not shown) may be provided to sense the motion of the mass by measuring capacitance between the electrodes and sense regions 160, 162.

Figure 7:
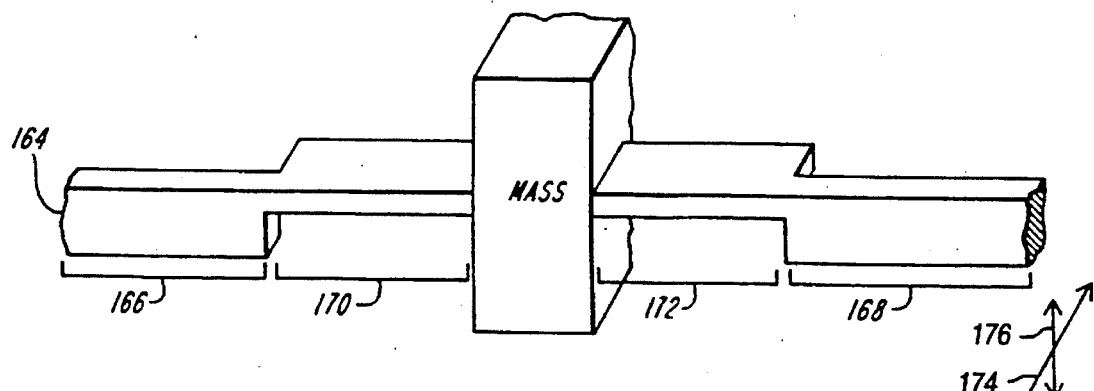
FIG. 7 is a cross-sectional view of a beam member of the gyroscope of FIG. 6 taken along lines 7—7.

Lateral and vertical vibration of the vibratable structures 150 and 152 are facilitated by the geometry of the beams, such as beam 164 which is shown in cross-section in FIG. 7. Beam 164 includes first and second segments 166, 168 which have a high height-to-width aspect ratio which is typically greater than 1. The high aspect ratio of these sections of the beam provide added flexibility in the lateral direction, within the plane of the device as indicated generally by arrow 174, while also providing increased resistance to vertical motion, perpendicular to the plane. In contrast, segments 170 and 172 have a much lower height-to-width ratio, on the order of 0.5 or less, which facilitates movement in the vertical direction indicated generally by arrow 176. The lower height-to-width ratio segments of the beam therefore resists movement in the lateral direction, parallel to the plane.

The use of deep boron diffusion to form the flexible tines or vibratable structures 38 and 40 of the tuning fork requires a significant gap, on the order of three microns, between the tines to insure that they do not diffuse together. Additionally, the boron also diffuses outwardly away from the original photolithographic line. This tends to limit or reduce the desired height-to-width ratio which allows the tines to be flexible in the lateral direction but stiff in the vertical direction.

The tuning fork gyroscope according to the present invention requires that the vibratable structures have a preferred mode of resonance parallel to the plane of the device. Accordingly, the height of the tines or beams which comprise a portion of the vibratable structures is preferred to be greater than their width, thus, a structure with a high aspect ratio. Vibratable structures comprised of high aspect ratio beams may be fabricated by selective boron diffusions through a slot in the silicon and the silicon oxide, selective epitaxial back filling and capping with another boron diffusion and subsequent anisotropic etching to define a beam with an aspect ratio of up to 10-to-1. Such a method is described in Applicant's co-pending U.S. patent application Ser. No. 07/599,131 entitled "MONOLITHIC MICROMECHANICAL VIBRATING STRING ACCELEROMETER WITH TRIMMABLE RESONANT FREQUENCY" which is incorporated herein by reference.

Figure 8A:
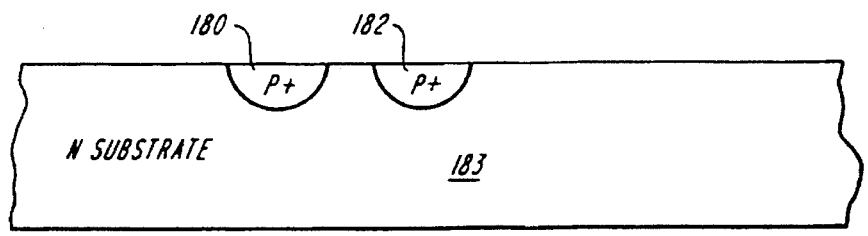
FIGS. 8A and 8B are schematic representations of several alternative methods of fabricating vibratable structures or tines for the gyroscope of the present invention.

Several additional methods may be utilized to fabricate tines or beams of varying aspect ratios. For example, two relatively shallow P+ Boron diffusions 180 and 182, FIG. 8A, may be provided in the N substrate 183. Anisotropic etching using a standard EDP process will result in two tines or beams defined generally by the P+ Boron doped areas 180, 182, with an aspect ratio on the order of 0.5. Although not a very high aspect ratio, such beams might be useful as the main vibratable structures of a tuning fork according to the present invention, or as a lower aspect ratio portion of a beam such as beam 164, FIG. 7.

Figure 8B:
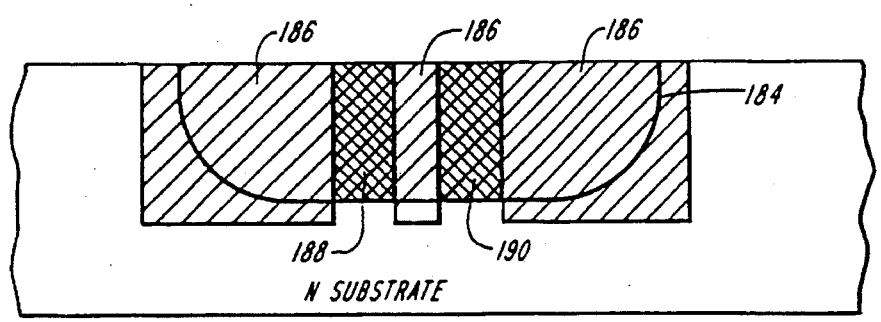

An additional method of fabricating tines is illustrated in FIG. 8B and includes applying a very deep Boron diffusion in the area defined by line 184. Subsequently, a plasma etching process is used to cut through the etch resistant Boron doped material in areas 186. A subsequent EDP etch can then be used to undercut the structure leaving tines 188, 190 with a high aspect ratio. Aspect ratios of 1 to 4 are generally possible with this process.

One feature of the micromechanical, monolithic tuning fork gyroscope of the present invention is the ability to provide drive and sense electronics on the semiconductor substrate itself that includes the gyroscope. Thus, one integral package includes both the gyroscope and the necessary drive and sense electronics. In addition, two gyroscopes, one disposed orthogonal to the other, may be located on one substrate, thus allowing for two input axes on one substrate. Further, by providing a second tuning fork gyroscope substrate according to the present invention disposed in a plane perpendicular to the first substrate, a three axis tuning fork gyroscope system with one redundant axis may be constructed.

Figure 9A:
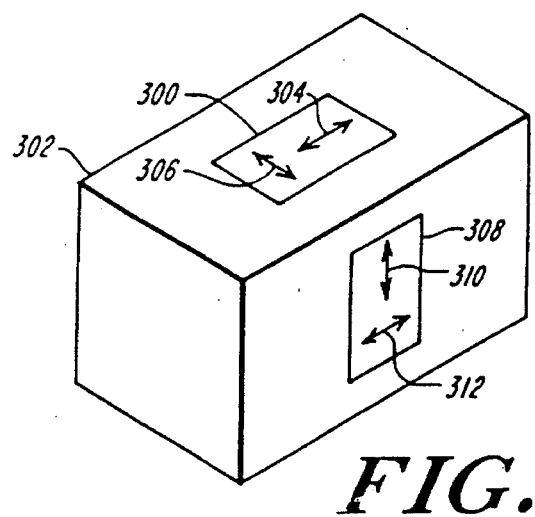
FIGS. 9A and 9B are schematic representations of a three axis instrument measurement unit including a plurality of micromechanical gyroscopes of the present invention along with other measurement devices.

For example, a first silicon substrate 300, FIG. 9A, mounted to mounting block 302 or other device includes first and second gyroscopes with mutually orthogonal in plane input axes as shown by arrows 304 and 306. By providing a second semiconductor substrate 308 mounted in a plane perpendicular to the mounting plane of first substrate 300, a third gyroscope with an in plane input axis parallel to arrow 310 provides a complete three axis gyroscope system with one input axis 312, parallel to axis 304, which is redundant or unused. Thus, only two mounting surfaces are required to provide a three axis gyroscope system.

Figure 9B:
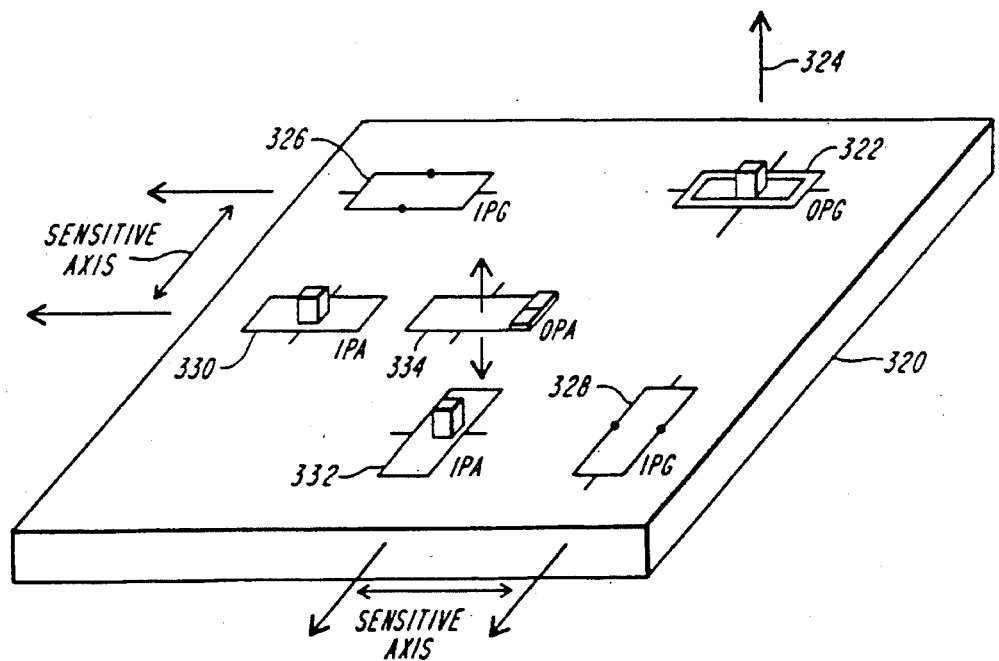

In a further embodiment, silicon substrate 320, FIG. 9B may include a first gyroscope 322 which has an out-of-plane input axis perpendicular to the planar surface of substrate 320 parallel to arrow 324. Such a gyroscope is described in U.S. Pat. No. 4,598,585. In addition, gyroscopes 326 and 328 according to the present invention each with an in-plane input axis, provide a 3-axis gyroscope system on one, semiconductor substrate.

The substrate also includes first and second in-plane sensing accelerometers 330, 332 such as a vibrating string accelerometer disclosed in co-pending U.S. patent application Ser. No. 07/599,131, entitled: MONOLITHIC MICROMECHANICAL VIBRATING STRING ACCELEROMETER WITH TRIMMABLE RESONANT FREQUENCY which is incorporated herein by reference. Also included is a third accelerometer 334 having an out-of-plane input axis. Such an accelerometer is disclosed in co-pending U.S. patent application Ser. No. 07/528,051, entitled: ADVANCED MICROMECHANICAL ACCELEROMETER which is also incorporated herein by reference. Thus, by further providing the three orthogonally sensing accelerometers 330, 334 a complete, three axis instrument measurement unit including all drive and sense electronics is provided on one substrate 300.

Various drive and sense electronics as well as a number of modes of operation may be utilized with various embodiments of the tuning fork gyroscope according to the present invention. For example, the tuning forks may be driven and sensed electromagnetically or electrostatically; in either open or closed loop; and the gyroscope may be designed to be self-oscillatory wherein an electronic loop may be used to maintain the tuning fork gyroscope at its natural or resonant frequency over a wide temperature range. In addition, consideration must be given to whether the tuning fork gyroscope will be fabricated on a pivoting plate supported by flexures or whether a non-pivoting device will be utilized.

The choice between pivoting and non-pivoting tuning fork gyroscope configurations depends on a number of factors. For example, an advantage of the pivoting structure is that the lateral vibration of the tuning forks is separated from vertical movement on the plate which results from rotation of the gyroscope about the input axis. Since the gyroscopic forces on the tuning forks are transmitted to the pivoting structure or plate, it is therefore not necessary to detect the bending or vertical deflection of the tines themselves. Accordingly, the tines do not have to do double duty, vibrating laterally and deflecting vertically in a manner that lends itself to readout. Instead, vertical movement is turned into an angular deflection of the plate or silicon structure which is therefore only dependent upon the flexures which connect the plate to the silicon frame. The flexures can therefore be properly and advantageously designed independently of the tuning forks.

Additionally, in a pivoting gyroscope, the plate area can be made arbitrarily larger than the tuning forks, since it does not play a part in the gyroscopic action. This means that there will be a much larger readout sensitivity for the pivoting gyroscope than for the non-pivoting version.

Figure 10:
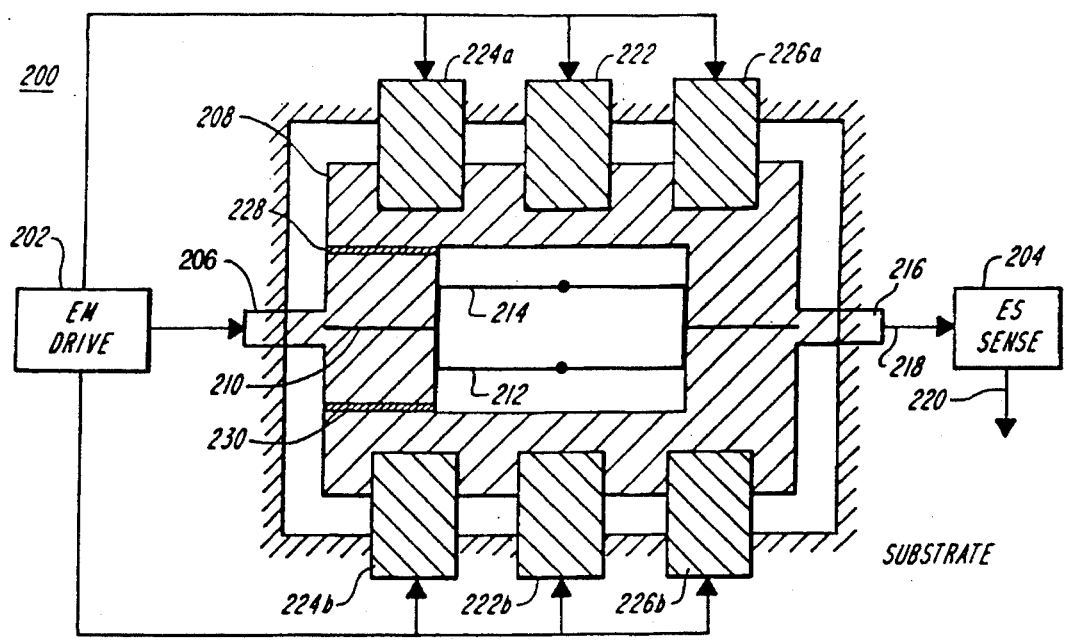
FIG. 10 is a schematic representation of a pivoting, closed end, tuning fork gyroscope according to one embodiment of the present invention adapted for electromagnetic drive and electrostatic sense electronics.

Several of the many possible combinations of gyroscope electronics and construction configurations will be detailed below for illustrative purposes, although many more combinations are possible and contemplated by the present invention. In the first example, pivoting gyroscope 200, FIG. 10, is illustrated with electromagnetic drive electronics 202 and electrostatic sense electronics 204. Drive electronics 202 apply an AC voltage to flexure 206 which is coupled to rotatable plate 208. Plate 208 includes a high conductive layer or wire 210 which begins at one end of flexure 206, but not on the flexure itself. Wire or conductive layer 210 splits symmetrically and passes on or through the first and second vibratable structures or forks 212, 214, then recombines into a single wire terminating at the second flexure 216. Output 218 from the second flexure 216 is then coupled to electrostatic sense electronics 204 which provides an output voltage signal 220 whose voltage is proportional to the input rate. This signal is subsequently processed utilizing well known signal processing techniques to provide the gyroscope output signal.

Tuning fork gyroscope 200 is also provided with electrodes 222a, 222b, 224a, 224b, and 226a, 226b. Electrodes may be disposed either below plate 208 (buried electrodes) or above plate 208 (bridge electrodes), and are arranged symmetrically along both sides of the plate. The electrodes are used for torquing the plate in the case of a closed-loop mode, and for sensing the angular displacement of the plate. Dielectric isolation gaps 228 and 230 are provided to eliminate any potential voltage gradient on plate 208.

Figure 11:
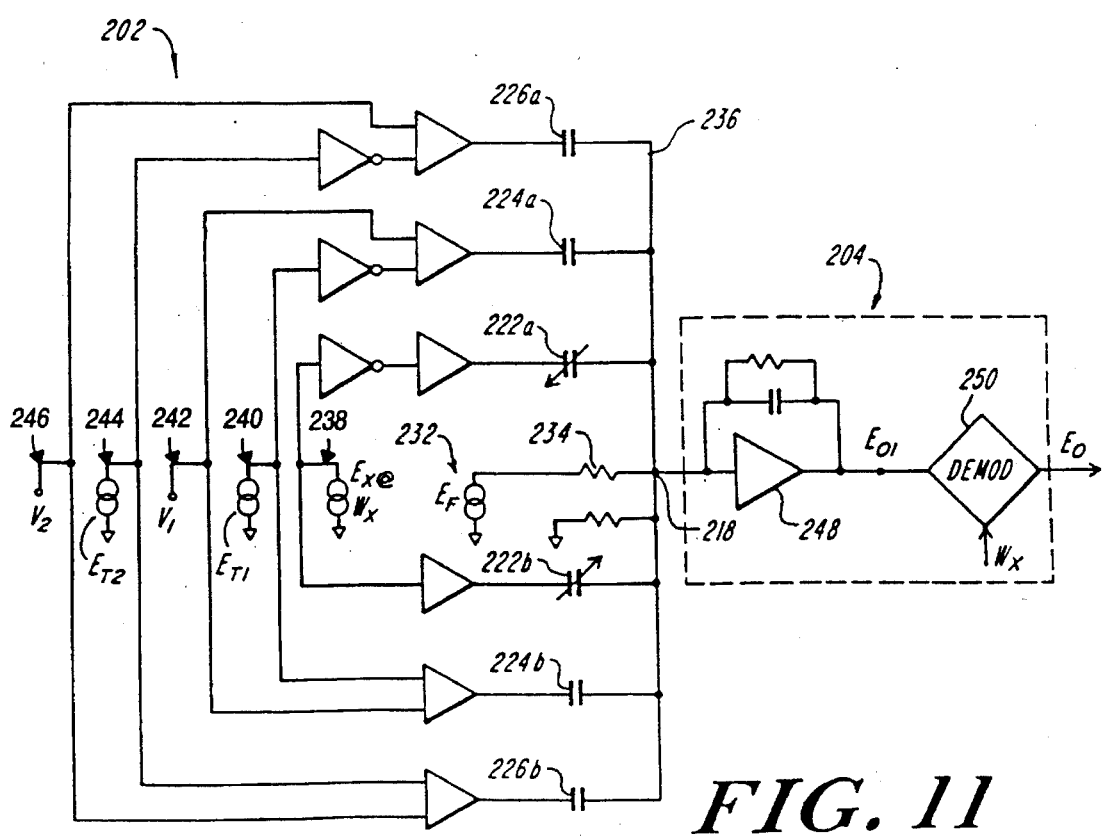
FIG. 11 is a more detailed schematic representation of the electromagnetic drive and electrostatic sense electronics of FIG. 10.

A more detailed schematic representation of electromagnetic drive and electrostatic sense electronics 202 and 204 is shown in FIG. 11 wherein an AC drive voltage $E_f$ from voltage source 232 is applied through resistor 234 to the tuning forks 212, 214 and plate 208, all represented by signal path 236. Drive voltage $E_f$, typically 1–10 volts at 1–10 Khz causes tuning forks 212, 214 to vibrate laterally. An excitation voltage source 238 provides an excitation voltage $E_x$, typically 1 volt at 0.1 to 1 Mhz, which serves as a reference signal to indicate rotational movement of plate 208 caused by an input rate about the sense axis. The inverted and non-inverted signals are applied to opposite sides of the tuning fork structure. If it is desired to operate the device in a closed-loop mode, two torque and bias voltages $E_{t1}$, $V_1$ and $E_{t2}$, $V_2$, 240–246 respectively, are provided to rebalance the rotational movement of the plate in phase and in quadrature with the vibration of the forks as will be explained in greater detail below.

The operation of the circuit is dependent upon the fact that output 218 from the flexures 216 is driven to virtual ground by the feedback circuit of operational amplifier 248. Angular rate causes the deflection of the tiltplate 208. The tilt is caused by the torque exerted upon the tiltplate from gyroscopic forces when there is an angular rate about the input axis. The tilt of the plate is measured by the capacitor sensor system made up of electrodes 222a, 222b, 224a, 224b, 226a and 226b as shown. The electrodes may also be used to torque the plate externally such as when a rebalance loop is used as described below.

The angle of rotation of the tiltplate is sensed by exciting one set of electrodes with $E_x$, a high frequency AC signal. By demodulating the signal using demodulator 250, with respect to the vibration frequency wx of the tuning forks, an envelope or modulating signal eo2 is recovered and provides a voltage proportional to the tilt angle. This voltage is proportional to the input rate when the gyroscope is operated in the open loop mode or, when the gyroscope is operated in the closed loop mode, the voltage is used to provide a signal to rebalance the tiltplate by means of the above mentioned electrodes.

The torquing voltage is proportional to the applied torque on the tiltplate by virtue of a conditioning system which makes use of the relations in the following equations to convert the square law force-voltage relationship for a capacitor into a linear voltage-torque relationship.

$$e_{222a} = -E_x;\ e_{222b} = E_x \quad (1)$$

$$e_{224a} = -E_{T1} - V1;\ e_{224b} = E_{T1} - V1 \quad (2)$$

$$e_{226a} = -E_{T2} - V2;\ e_{226b} = E_{T2} - V2 \quad (3)$$

$$\Sigma T = (e_{222a}^2 - e_{222b}^2) + (e_{224a}^2 - e_{224b}^2) + (e_{226a}^2 - e_{226b}^2) \quad (4)$$

$$\Sigma T = E_x 2 - E_x 2 + (E_{T1} - V_1)^2 + (E_{T2} - V_2)^2 - (E_{T2} - V_2)^2 \quad (5)$$

$$\Sigma T = +4 E_{T1} V_1 + 4 E_{T2} V_2 \quad (6)$$

Figure 12:
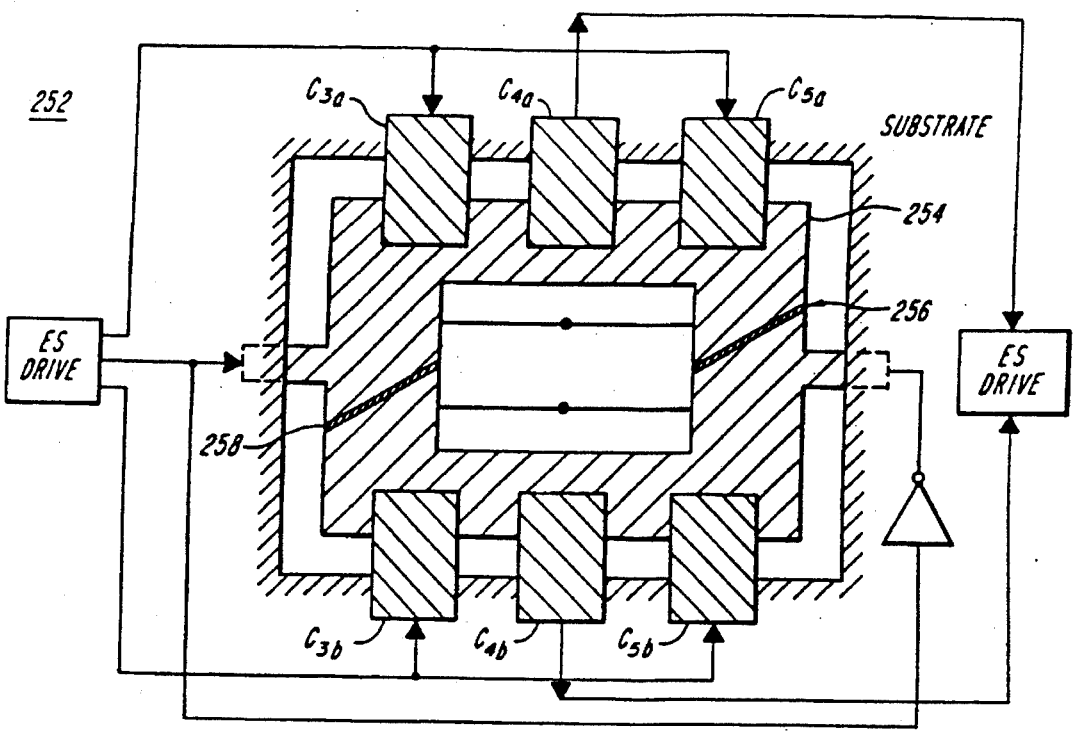
FIG. 12 is a representation of a two-piece, pivoting, closed end, tuning fork according to another embodiment of the present invention incorporating electrostatic drive and sense electronics.
Figure 13:
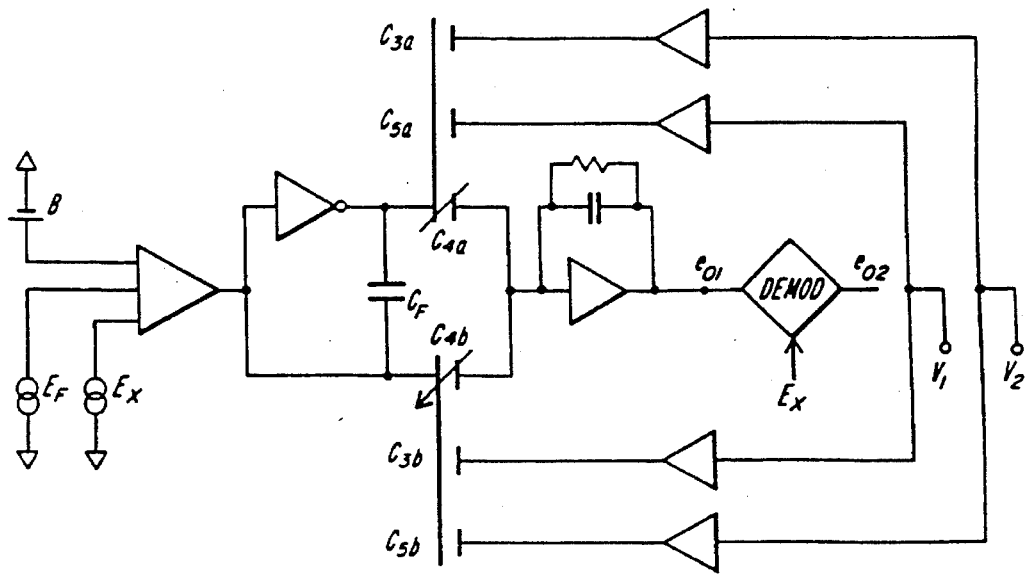
FIG. 13 is a more detailed schematic of the electrostatic drive and sense electronics of FIG. 12.

A tuning fork gyroscope according to the present invention utilizing electrostatic electronics for both drive and sensing is illustrated in FIG. 12 by a pivoting closed-end tuning fork gyroscope 252. The gyroscope includes plate 254 comprised of two halves, each half electrically isolated by means of gaps and lap joints 256, 258. In this embodiment, inverted and non-inverted driving voltages are applied to the flexures. The inverted and non-inverted driving voltages cause the tuning fork structure, which looks capacitive as represented by capacitor $C_f$, FIG. 13, to vibrate laterally. As in the previous embodiment describing electromagnetic electronics, an excitation voltage $E_x$ as well as a bias voltage B, typically 5 volts, are provided. The voltages (V) across capacitors C3a–C5b are represented by equations 7–12 below.

$$V_{C3a} = (-E_f - E_x - B) - (-V_1) \quad (7)$$

$$V_{C5a} = (-E_f - E_x - B) - (-v_2) \quad (8)$$

$$V_{C3b} = (E_f + E_x + B) - (-V_1) \quad (9)$$

$$V_{CSb}=(E_f+E_x+B)-(-V_2) \tag{10}$$

$$V_{C4a}=-(E_x+E_fB) \tag{11}$$

$$V_{C4b}=(E_x+E_fB) \tag{12}$$

The torque ($\Sigma T$) measured by the gyroscope is illustrated by equations 13–15.

$$\Sigma T_1=[-(E_f+E_x+B)+V_1)]^2-[(E_f+E_x+B)+V_1]^2=-4V_1[E_f+E_x+B] \tag{13}$$

$$\Sigma T_2=[-(E_f+E_x+B)+(V_2)]^2-[(E_f+E_x+B)+V_1]^2=-4V_2[E_f+E_x+B] \tag{14}$$

$$\Sigma T=\Sigma T_1+\Sigma T_2=-4[V_1B+V_2B+E_f(V_1+V_2)+E_x(V_1+V_2)] \tag{15}$$

Figure 14:
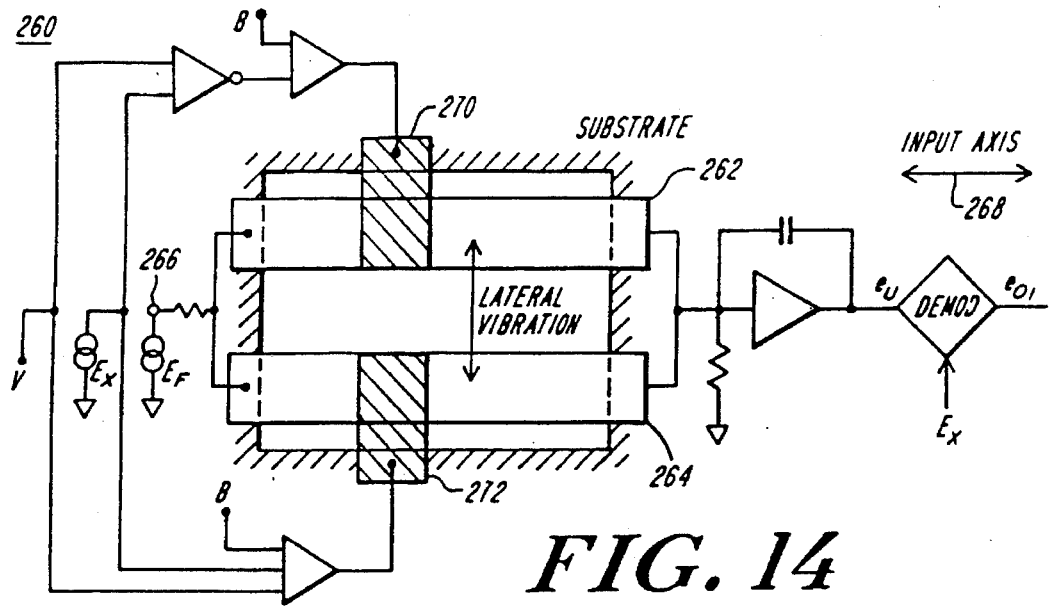
FIG. 14 is a schematic representation of a non-pivoting, closed end tuning fork according to yet another embodiment of the present invention including electromagnetic drive and electrostatic sense electronics.

An additional embodiment of the tuning fork gyroscope of the present invention is illustrated as a closed end, non-pivoting micromechanical tuning fork gyroscope 260, FIG. 14. In contrast to a pivoting plate gyroscope previously described in conjunction with FIGS. 10 and 12 wherein angular rotation about the input axis produces a tilt or rotation in the plate, the tuning forks in non-pivoting gyroscopes experience an upward force on one fork while the other fork experiences a downward force. Thus, the non-pivoting tuning fork gyroscope 260 includes two parallel vibratable structures or forks 262 and 264 which are driven by an AC voltage source ($E_f$) 266. The voltage causes the tuning forks to vibrate laterally, in the plane of the structure. Angular rotation about the gyroscope's input axis indicated generally by arrow 268 causes the tuning forks to vibrate in a vertical direction, perpendicular to the lateral direction.

Angular rotation or readout is performed electrostatically by one or more electrodes above or below the tines such as electrodes 270 and 272 and utilizing the illustrated circuit which is similar to the circuits previously described.

As previously discussed, the tuning fork gyroscope and electronic circuits of the present invention can be operated in two modes namely, closed-loop or open-loop. The circuit described in connection with FIGS. 10 and 11 illustrates an open-loop mode configuration. A closed-loop circuit is illustrated by box 274, FIG. 15. Wherein there are four inputs namely $E_{T1}$ ($W_y$,0 or vibration frequency angle 0), $E_{T2}$ ($W_y$,90 or vibration frequency, angle 90), $V_1$ and $V_2$. Output 276 from the gyroscope is an AC signal, carrier modulated. This signal is then demodulated and filtered by demodulator/filter 278, against the excitation signal $E_x$ which strips out the carrier. This produces an AC signal 280 at the vibration frequency which has an amplitude proportional to the angular rate of the gyroscope.

The signal is then AC amplified by amplifier 282 and again demodulated and filtered against the vibration frequency at angle 0 by demodulator/filter 284, and against the vibration frequency at angle 90 by demodulator/filter 286. The output signals from demodulator/filters 284,286 are then conditioned which provide quadrature and gyroscope signals 288 and 290 respectively which are fed back to the input of the gyroscope so that the plate is maintained at AC null in both phases. The gyroscope signal output 290 is the desired gyroscope output, whose voltage is proportional to the angular input rate.

Figure 15:
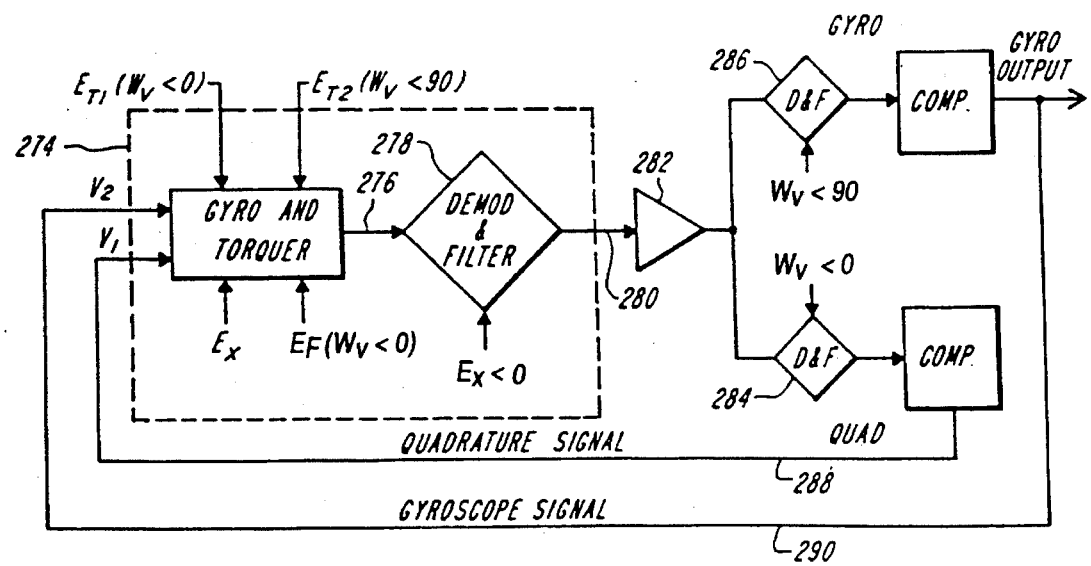
FIG. 15 is a schematic of electromagnetic drive and electrostatic sense electronics including a closed-loop rebalancing circuit according to yet another embodiment of the present invention.

The circuit described in conjunction with FIG. 15 applies when the vibration frequency of the tuning forks or vibratable structures is not equal to the natural frequency of the pivoting gyroscope plate. The electronics may also be suitably modified to allow operation when the vibration frequency of the tuning forks is equal to the natural frequency of the gyroscope plate. Such a modification is well known to those skilled in the art.

Figure 16:
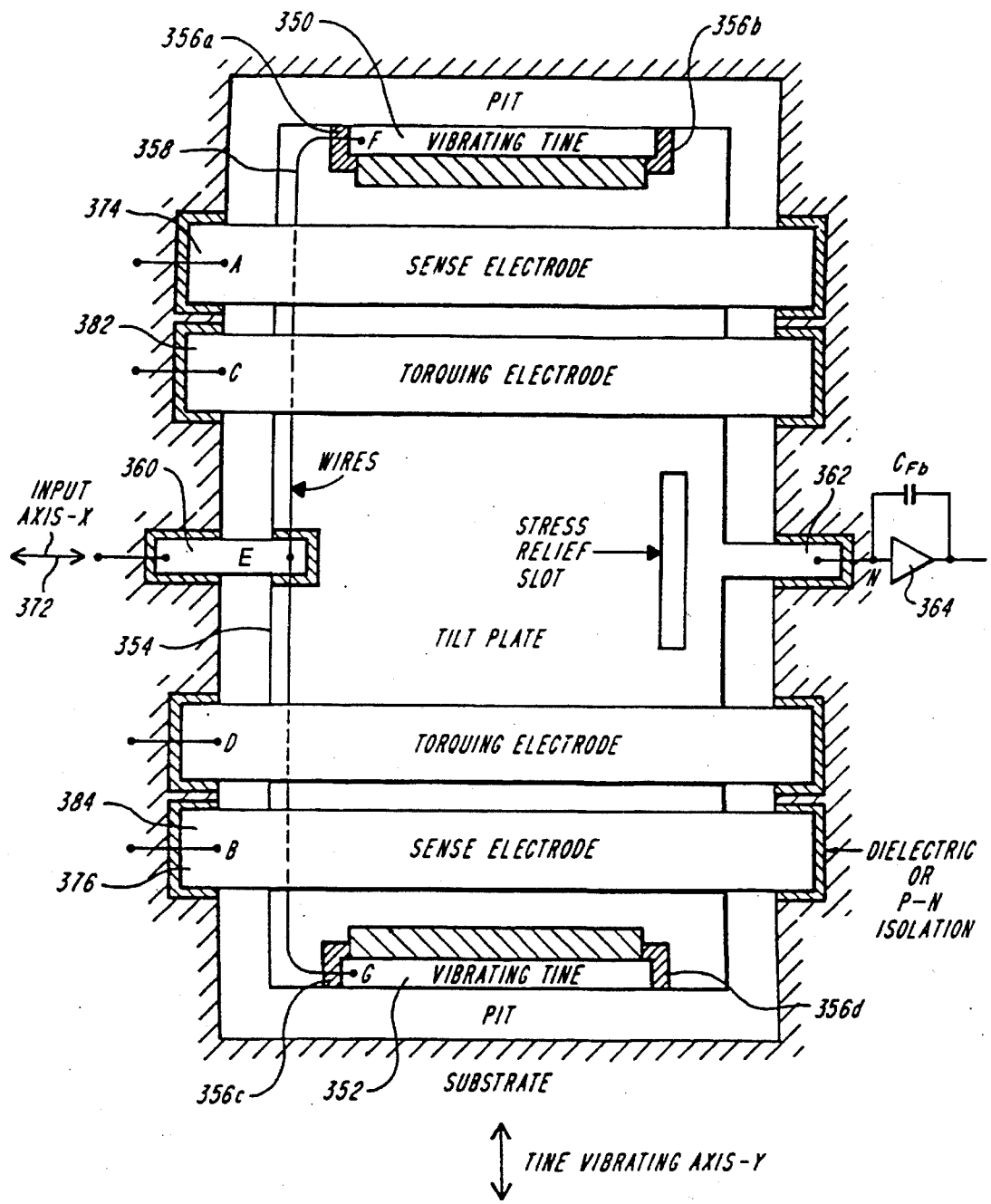
FIG. 16 is a top view of a schematic representation of an alternative, pivoting, tuning fork gyroscope according to the present invention adapted for electrostatic drive and sense electronics.

An additional embodiment of the micromechanical tuning fork gyroscope of the present invention is shown in FIG. 16.

The selection of such an embodiment is driven by the desire to maximize the sensitivity of the device. To achieve this goal, the desire is to maximize the gyroscopic torque on the pivoting tilt plate 354.

As shown in equation 16 below, if all the inertia of the tuning fork gyroscope according to the present invention were concentrated in the tuning forks or vibrating tines themselves, then the gyroscopic torque produced when an input rate is applied is shown in equation 16 where $I_1$ is the change in the moment of inertia about the input axis ($I_x$) as the tuning fork oscillates.

$$\text{Gyroscopic torque} = \frac{I_1}{I_x} \delta_t W_x \cos \delta_t t \tag{16}$$

where $I_1=\Phi I_x=2Mr \Phi r$;

$\delta_t$ is the tine frequency;

t is time;

$W_x$ is the input rate;

M is the mass of the tuning forks; and r is the deflection of the tine along the Y axis.

Since r is the deflection of the tuning fork tine, the tines should be located as far apart as possible to maximize the gyroscopic torque for a given deflection of the tines. Stated differently, the force on the tines from the gyroscopic action is fixed for a given tine deflection and therefore, by placing the tines as far as possible from the axis of rotation, the torque on the tilt plate is maximized. The larger gyroscopic torque in effect increases the angular momentum which results in more volts per unit rate input, raising the signal level, reducing the gyroscope's sensitivity to Brownian noise, thus making design of the gyroscope and the electronics easier.

As shown in FIG. 16, the vibrating tines 350, 352 represented, for the sake of simplicity, by simple bars F and G, are located on the extreme edge of tilt or pivoting plate 354. The tines are electrically isolated from the rest of the tilt plate by dielectric or P-N isolation regions 356a–356d. The tines are connected by a wire 358 which is dielectrically isolated from the rest of the structure and connected to input flexure pivot 360 (E) also dielectrically isolated from the remainder of the structure. Wire 358 places a common input voltage $E_t$ on each vibrating tine 350, 352.

Output flexure pivot 362, also dielectrically isolated, in turn is connected to the input node (N) of operational amplifier 364 as will be further explained below. Thus, the potential of tilt plate 354 is driven to that of the operational amplifier input node (N) which in turn is driven to virtual ground by the feedback configuration of operational amplifier 364.

Upon application of a sinusoidal voltage ($E_t$) on input flexure 360 (E) an electrostatic force is generated between the tines 350, 352 and the adjacent tilt plate 354 due to the potential difference between the tines and the tilt plate. This voltage potential difference will cause the tines to vibrate at an amplitude which is dependent upon the applied voltage, the frequency of the applied voltage, and the mechanical characteristics of the tines.

To minimize the required tine drive voltage, it is most desirable to drive the tines at their resonant frequency. In order to accomplish this, the displacement distance moved by the tines must be measured. This may be accomplished by the circuit shown in accompanying FIG. 17 including the loop formed by E, N, I and $E_t$.

In this circuit, an AC voltage $E_{xt}$ at a typical frequency of greater than 100 KHz, which is much higher than the resonant frequency of the tines, typically 3 to 10 KHz is applied as shown. This AC signal is used as a carrier and is modulated by the tine vibration.

The capacitance labeled $C_t$ is the capacitance of the tine gap. A change in capacitance $C_t$ is a function of the displacement of the tines. Thus, the output voltage of operational amplifier 364 is proportional to the capacitance $C_t$ of the tines, and the change in the output voltage of the operational amplifier is similarly proportional to the change in capacitance $C_t$ of the tines. Since the output of the operational amplifier is a function of the tine capacitance, the output can be used to provide an indication of tine position. This may be done by demodulating the output 366 of the operational amplifier with respect to the tine excitation frequency $\delta_{xt}$. The output (I) 368 of the demodulator is appropriately modified by feedback network 370 to provide the tine voltage $E_t$. This will cause the tines to oscillate at their resonant frequency $\delta_t$. A fixed bias voltage $B_t$ of typically 1–10 volts, is also summed in with the tine voltage $E_t$ and the tine vibratory frequency $E_{xt}$ to linearize the force characteristics.

As a result of an input rate along the gyroscope's input axis, the tilt plate 358 will oscillate about the input axis indicated generally by arrow 372, with the angle of vibration proportional to the input rate. This angle or amount of vibration of the tilt plate must then be measured. This may be accomplished by including sense electrodes 374, 376 which may run over (bridge) or under (buried) tilt plate 358. The sense electrodes are represented as nodes A and B in the circuit diagram of FIG. 17.

An AC excitation voltage $E_{xs}$ of frequency $\delta_{xs}$, typically equal to or greater than 100 KHz, and much higher than the vibration frequency but different than the tine excitation frequency $\delta_{xt}$ is applied. The AC excitation voltage $E_{xs}$ is applied directly to one sense electrode and inverted with respect to the other electrode.

When the tilt plate is level, that is, no input angular rate is present, the capacitances between the two sense electrodes and the tilt plate are equal and therefore, there is no output from operational amplifier 364. When the plate tilts as a result of an input angular rate, the capacitances $C_{s1}$ and $C_{s2}$ change differentially and therefore, a voltage is generated by operational amplifier 364 which is proportional to the difference in capacitances. The output of operational amplifier 364 is demodulated by demodulator 378 with respect to the tine excitation frequency $\delta_{xs}$ to provide an output signal 380 that is a function of the tilt angle of the plate and thus, a function of the input angular rate.

Figure 17:
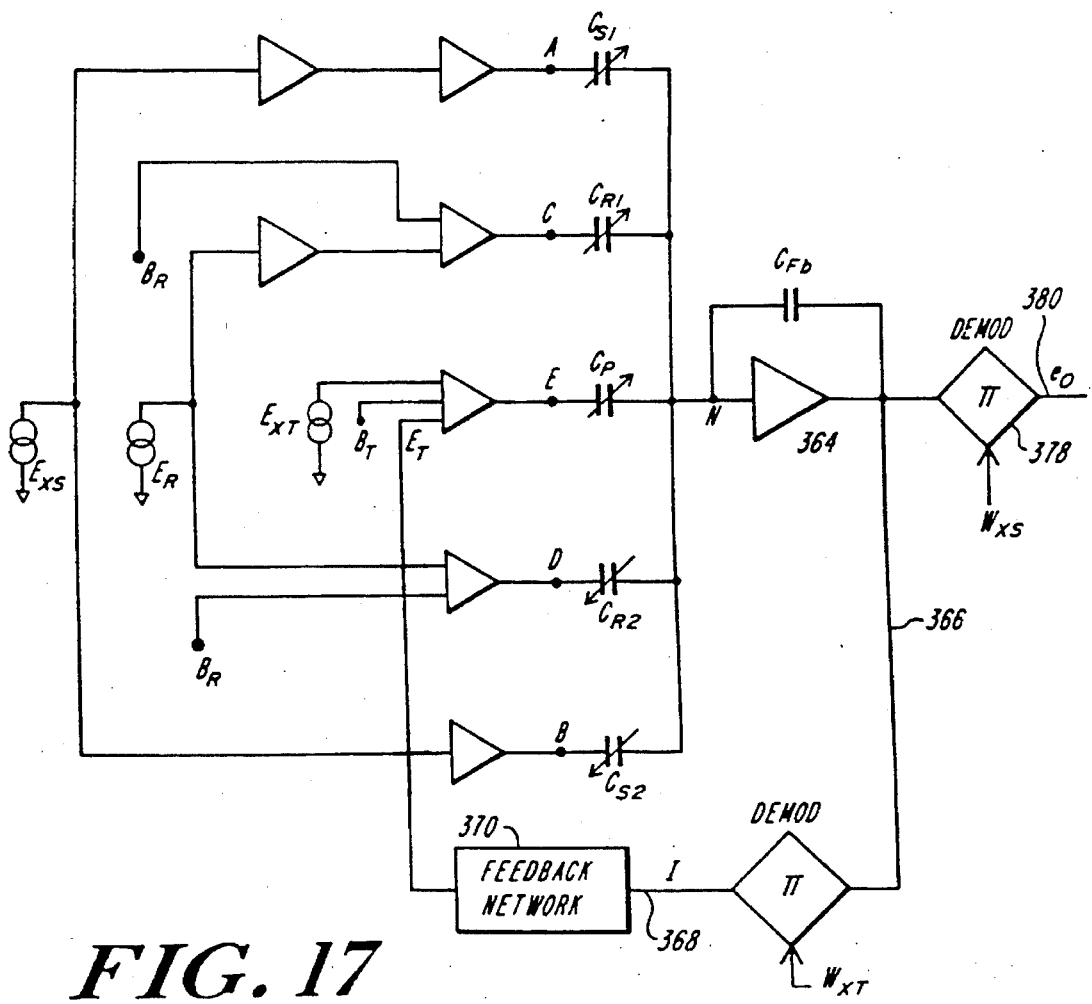
FIG. 17 is a schematic of the electrostatic drive and sense electronics for FIG. 16.

Further, torquing electrodes 382, 384, labeled as nodes C and D, are provided to enable a rebalance torque to be applied to the tilt plate. As shown in FIG. 17, a rebalance voltage $E_R$ and a linearizing bias $B_R$ are summed and applied to the torquing electrodes.

In the embodiment described immediately above, discussions were focused on the gyroscope in general, the tines having been represented as simple bars. In a preferred embodiment, however, such a structure would not afford as efficient of a vibratable structure as desired. The most efficient vibratable structure must be flexible horizontally that is, within the plane of the device, while rotationally and vertically stiff.

Figure 18:
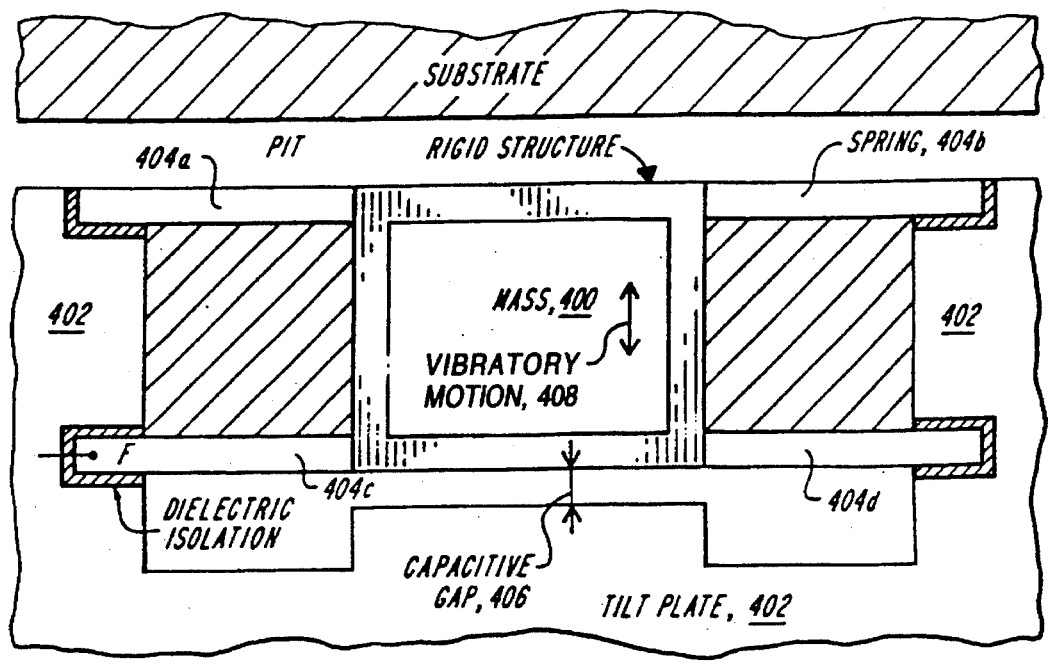
FIG. 18 is a more detailed schematic diagram of one embodiment of a vibratable structure for the tuning fork gyroscope of the present invention.

Accordingly, the preferred embodiment of a pivoting, micromechanical tuning fork of the present invention includes the tine structure shown generally in FIG. 18 which includes a mass 400 attached to tilt plate 402 by means of four tines 404a–404d which act like "springs". A capacitive gap indicated generally by arrow 406 is formed between the mass and the adjacent plate 402. Tines 404a–404d are high aspect ratio beams and provide no other function other than to allow the mass to vibrate parallel to axis 408. The vibrating frequency of such a vibratable structure is a function of the supporting tines 404a–404d and the central mass. The mass of the supporting tines is negligable. This avoids undesirable effects that might occur due to multimode vibration of the supporting tines or springs. Further, the vertical rigidity of the supporting tines in all directions but laterally means that there will be no problems with other resonants either vertically, out of plane or rotationally. This approach is in accordance with the desired principal of isolation, which requires one function for each structural element. Further, the four supporting tine structures provide the most rotational stiffness which tends to minimize effects due to mass unbalance.

Figure 19:
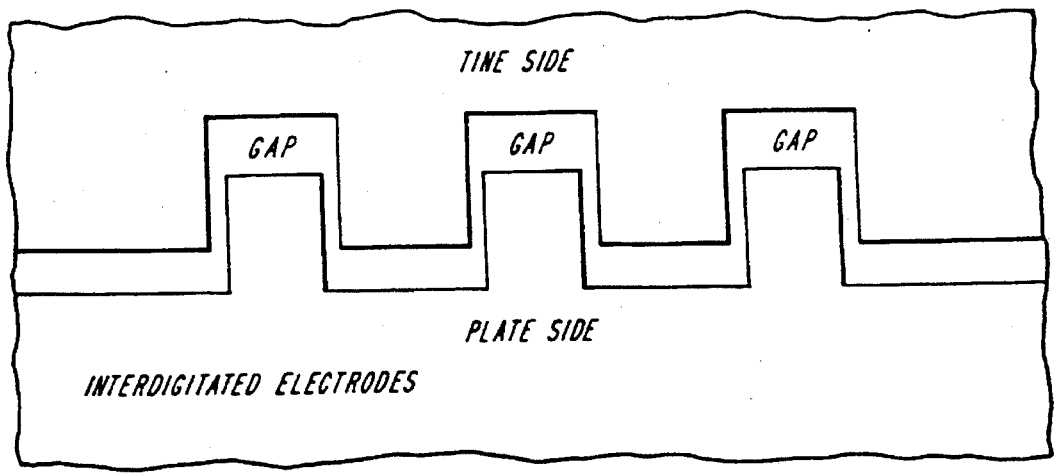
FIG. 19 is an illustration of an alternative embodiment of the gap between the vibratable structure and the tilt plate of a tuning fork gyroscope according to the present invention.

Although capacitive gap 406 is formed by simple parallel structures, an alternative embodiment includes the interdigital gap structure shown in FIG. 19.

Figure 20:
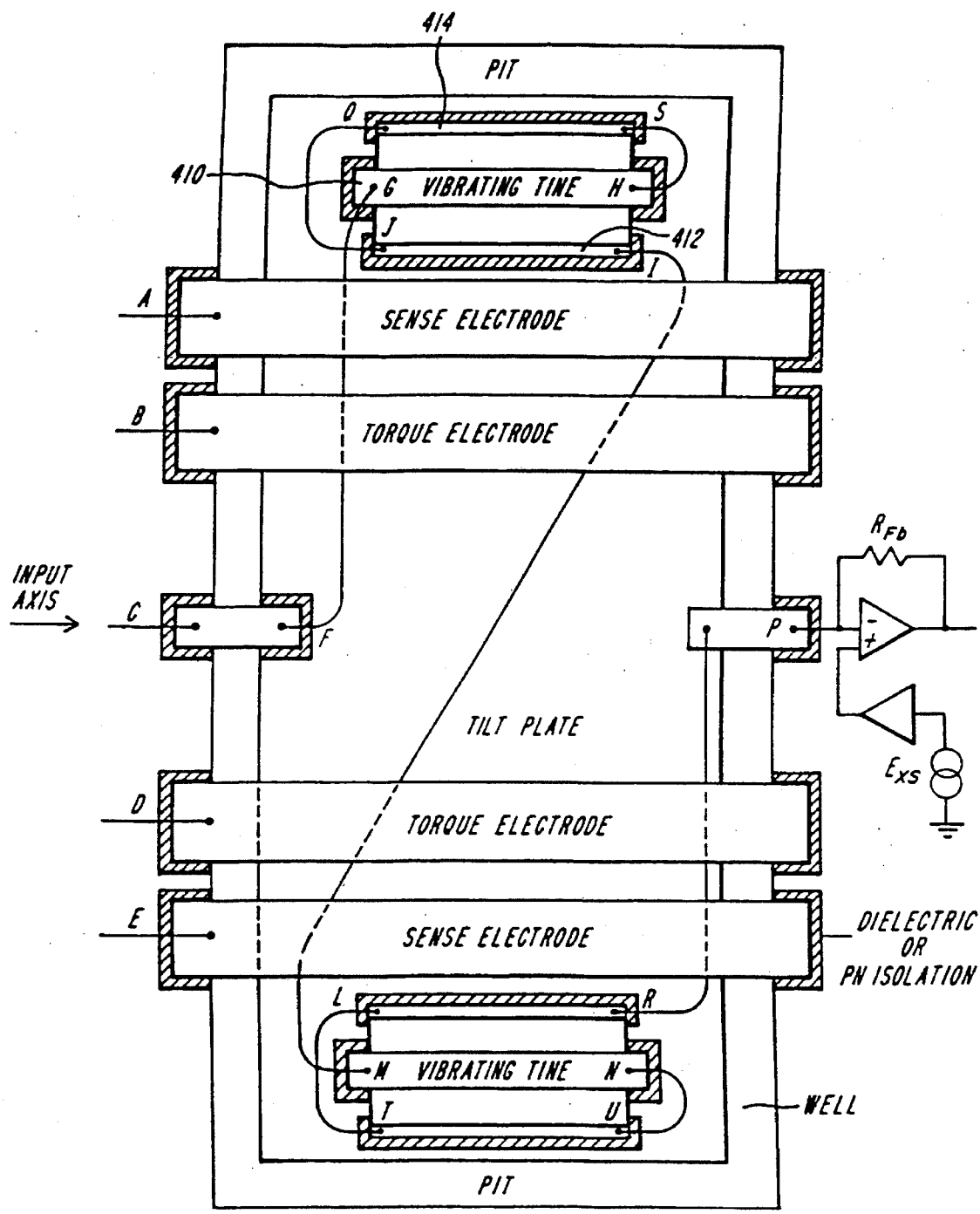
FIG. 20 is a top view of a schematic representation of yet another embodiment of a pivoting, tuning fork gyroscope according to the present invention adapted for electromagnetic drive and electrostatic sense electronics.

An additional embodiment of a pivoting, micromechanical tuning fork according to the present invention is illustrated in FIG. 20 which, although similar to the pivoting tuning fork gyroscope shown in FIG. 16, is adapted to utilize electromagnetic drive and electrostatic sense and rebalance torquing electronics. In this embodiment, the vibrating tines such as tine 410, again illustrated as a simple bar for the sake of simplicity, is disposed between two conductive electrodes 412, 414. The tines are driven electromagnetically by properly controlling the direction of current flow through the tine and the adjacent conductive regions of the tilt plate.

Figure 21:
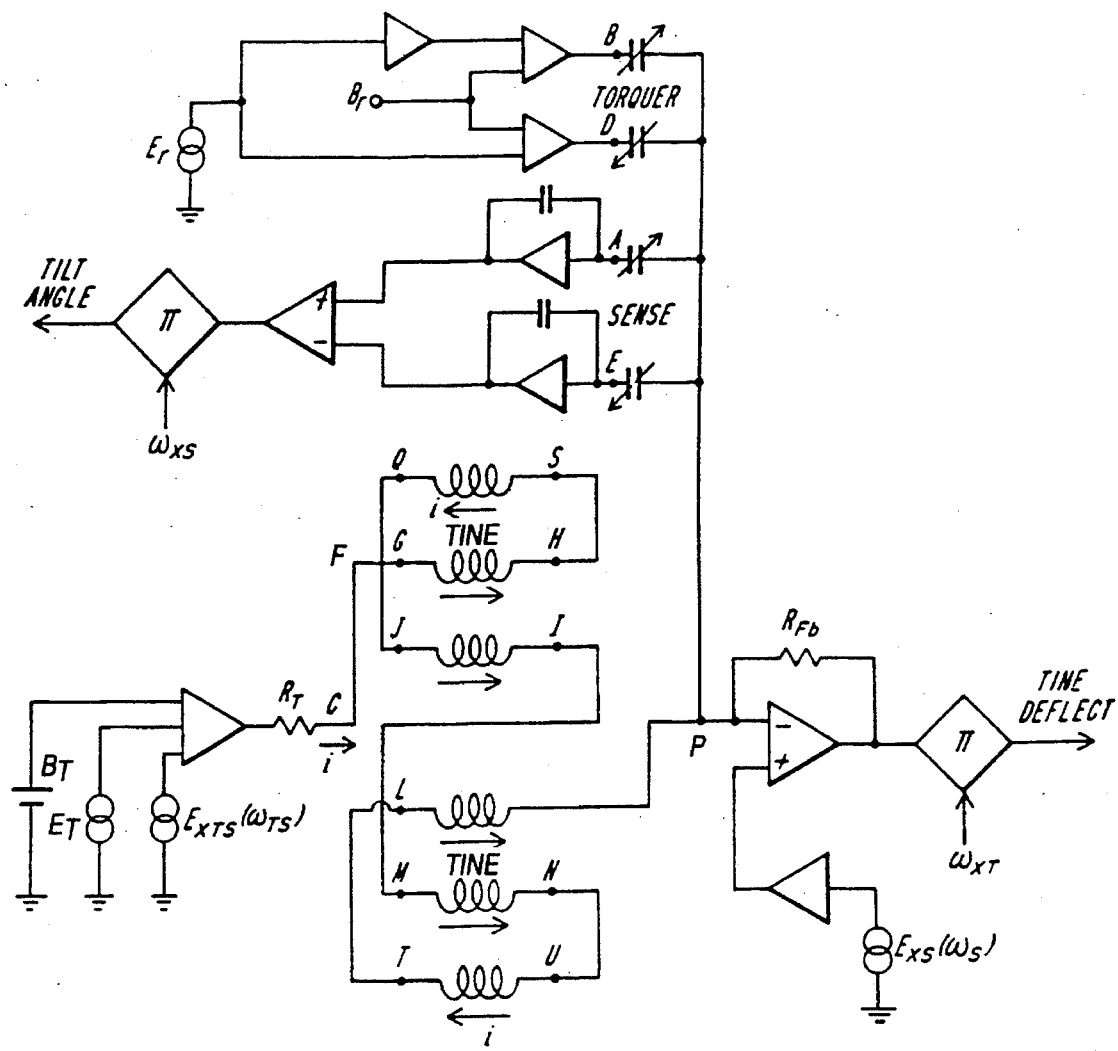
FIG. 21 is a schematic of the electromagnetic drive and electrostatic sense electronics for the gyroscope of FIG. 20.

The direction of current flow is best illustrated by the schematic diagram of FIG. 21. To fabricate such a structure, the tines may be sufficiently doped to carry enough current. Alternatively, an electrically isolated metallization layer may be deposited on top of the tines. Similarly, the areas of the tilt plate adjacent the vibrating tines may be similarly doped or include electrically isolated metallization layers. Electrostatic sense and torquing electronics, similar to those described in conjunction with FIG. 17 are contemplated.

Although specific features of the invention are shown in some drawings and not in others, this is for convenience only as each feature may be combined with any or all of the other features in accordance with the invention.

Modifications and substitutions by one of ordinary skill in the art are considered to be within the scope of the present invention which is not to be limited except by the claims which follow.

We claim:

1. A monolithic, micromechanical tuning fork gyroscope, for detecting angular rotation about at least a first rotation sensitive axis, comprising:

a silicon substrate in which has been selectively etched a pit, and over which is suspended a silicon structure;

said silicon structure disposed within a first plane and including at least first and second closed-ended elongate vibratable structures having, in line, a central mass and resilient attachments to said silicon structure, said first and second closed-ended vibratable structures disposed generally adjacent and parallel to one another;

drive means, for energizing said first and second closed-ended vibratable structures to vibrate laterally along an axis normal to said rotation sensitive axis and within said first plane, said lateral vibration of said first and second closed-ended vibratable structures effecting simultaneous vertical movement parallel to a second plane and normal to said first plane of at least a portion of said silicon structure upon the occurrence of angular rotation of said gyroscope about said first rotation sensitive axis; and means for sensing said simultaneous vertical movement of said at least a portion of said silicon structure, and for providing a voltage output signal proportional to said sensed vertical movement, said voltage output signal providing an indication of angular rotation detected by said gyroscope.

2. The gyroscope of claim 1 wherein said first closed-ended vibratable structure includes a first end coupled to a first segment of said silicon structure, and a second end coupled to a second segment of said silicon structure, said second segment located generally diametrically opposed from said first segment; and said second closed-ended vibratable structure is disposed parallel to said first closed-ended vibratable structure, and includes a first end coupled to said first segment of said silicon structure, and a second end coupled to said second segment of said silicon structure.

3. The gyroscope of claim 2 wherein each of said first and second closed-ended vibratable structures include a mass disposed generally about a longitudinal central point of each of said first and second closed-ended vibratable structures.

4. The gyroscope of claim 3 wherein each of said mass include a silicon mass on which is disposed a counter weight.

5. The gyroscope of claim 4 wherein said counter weight is selected from a high density group consisting of gold, tungsten and lead.

6. The gyroscope of claim 4 wherein each of said silicon masses is integral with said, first and second vibratable structures respectively.

7. The gyroscope of claim 3 wherein said mass on each of said first and second, closed-ended vibratable structures includes a center of gravity within said first plane.

8. The gyroscope of claim 1 further including:

first and second flexible elements coupling said silicon structure to said substrate, and suspending said silicon structure over the selectively etched pit, each of said flexible elements integral with said substrate and said silicon structure, and disposed generally co-linear and co-planar with said first rotation sensitive axis, for allowing said silicon structure to rotate about said first rotation sensitive axis;

said first flexible element including a first end coupled to a first region of said silicon substrate and a second end coupled to a first side of said silicon structure;

said second flexible element including a first end coupled to a second region of said silicon substrate diametrically opposed from said first region of said silicon substrate and said first flexible element, and a second end coupled to a second side of said silicon structure;

said silicon structure including first and second segments, said first segment structurally coupled and electrically isolated from said second segment;

said first closed-ended vibratable structure including a first end coupled to a first region of said first segment, and a second end coupled to a second region of said first segment, said second region located generally diametrically opposed from said first region;

said second closed-ended vibratable structure including a first end coupled to a first region of said second segment, and a second end coupled to a second region of said second segment, said second region located generally diametrically opposed from said first region;

wherein said drive means is operative for energizing said first and second closed-ended vibratable structures to vibrate laterally, co-planar with and along an axis normal to said first rotation sensitive axis, and vibrating of said first and second vibratable structures effecting rotational movement of said silicon structure about said rotation sensitive axis upon the occurrence of angular rotation of said gyroscope about said first rotation sensitive axis; and wherein said means for sensing senses rotation of said silicon structure, for providing a voltage output signal proportional to the rotational movement of said silicon structure, said voltage output signal providing an indication of angular rotation detected by said gyroscope.

9. The gyroscope of claim 8 further including means for providing stress relief of tensile forces between said silicon structure and said silicon substrate.

10. The gyroscope of claim 9 wherein said means for providing stress relief includes at least one tension relief beam formed by an opening having a predetermined length and width disposed in said silicon structure, said at least one tension relief beam coupled to the second end of at least one of said first and second flexible elements.

11. The gyroscope of claim 10 further including a second opening having a predetermined length and width, and forming a second tension relief beam to which is coupled the second end of the other of said first and second flexible elements.

12. The gyroscope of claim 10 wherein said at least one tension relief beam has a height-to-width ratio greater than one.

13. The gyroscope of claim 12 wherein said height-to-width ratio is at least two-to-one.

14. The gyroscope of claim 8 wherein said first and second segments are structurally coupled and electrically isolated by means of a lap joint.

15. The gyroscope of claim 8 wherein said first and second segment are structurally coupled and electrically isolated by means of a dielectric isolation region.

16. The gyroscope of claim 1 wherein said drive means applies a sinusoidal voltage to each of said first and second closed-ended vibratable structures.

17. The gyroscope of claim 16 wherein said sinusoidal voltage applied at a given instant to said first closed-ended vibratable structure is of opposite polarity to the sinusoidal voltage applied at said given instant to said second closed-ended vibratable structure.

18. The gyroscope of claim 1 further including at least one sense electrode sensing movement of said at least a portion of said silicon structure.

19. The gyroscope of claim 18 wherein said at least one sense electrode includes at least one bridge electrode coupled to said silicon substrate.

20. The gyroscope of claim 19 wherein said at least one bridge electrode is electrically isolated from said silicon substrate.

21. The gyroscope of claim 18 wherein said at least one sense electrode includes at least one buried electrode.

22. The gyroscope of claim 1 wherein said means for sensing rotation includes electrostatic sense means, for electrostatically sensing rotation of said non-etched silicon structure.

23. The gyroscope of claim 22 wherein said electrostatic sense means includes means for measuring differential capacitance between said first and second segments of said non-etched silicon structure and at least one sense electrode.

24. The gyroscope of claim 1 wherein said silicon substrate further includes a second selectively etched pit over which is suspended a second, silicon structure, said second, silicon structure including third and fourth closed-ended vibratable structures, for forming at least a second, micromechanical tuning fork gyroscope disposed co-planar with a first micromechanical tuning fork gyroscope, and oriented co-planar with and orthogonal to said first tuning fork gyroscope, for detecting angular rotation about a second rotation sensitive axis co-planar with and generally orthogonal to said first rotation sensitive axis.

25. The gyroscope of claim 24 further including a third, micromechanical tuning fork gyroscope disposed in a plane orthogonal to said first plane, for detecting angular rotation about a third rotation sensitive axis orthogonal to said first and second rotation sensitive axes.

26. The gyroscope of claim 24 further including
a third gyroscope having a third rotation sensitive axis normal to the plane of the first and second tuning fork gyroscopes and orthogonal to the rotation sensitive axes of the first and second tuning fork gyroscopes; and first, second and third accelerometers, for detecting acceleration along said first, second and third rotation sensitive axes respectively, and forming along with said first, second and third gyroscopes a three axis instrument measurement unit on one silicon substrate.

27. The gyroscope of claim 1 wherein said drive means includes electrostatic drive means.

28. The gyroscope of claim 1 wherein said drive means includes at least first and second electrodes, for applying a drive voltage to said first and second closed-ended vibratable structures.

29. The gyroscope of claim 8 further including rebalance means, responsive to said means for sensing, for counteracting and zeroing the rotational movement of said silicon structure about said rotation sensitive axis upon the occurrence and sensing of angular rotational of said gyroscope about said rotation sensitive axis.

30. A pivoting, monolithic, micromechanical tuning fork gyroscope, for detecting angular rotation about at least a first rotation sensitive axis, comprising:

a silicon substrate in which has been selectively etched a pit, and over which is suspended a silicon structure;

first and second flexible elements coupling said silicon structure to said substrate, and suspending said silicon structure over the selectively etched pit, each of said flexible elements integral with said substrate and said silicon structure, and disposed generally co-linear and co-planar with said rotation sensitive axis, for allowing said silicon structure to rotate about said rotation sensitive axis;

said first flexible element including a first end coupled to a first region of said silicon substrate and a second end coupled to a first side of said silicon structure;

said second flexible element including a first end coupled to a second region of said silicon substrate diametrically opposed from said first region of said silicon substrate, and a second end coupled to a second side of said silicon structure, diametrically opposed from said first side of said silicon structure;

said silicon structure including first and second closed-ended vibratable structures, said first and second closed-ended vibratable structures disposed generally parallel to one another, each of said first and second closed-ended vibratable structures including a central mass and, in line, resilient attachments to said silicon substrate integral with an associated vibratable structure;

said first closed-ended vibratable structure including a first end coupled to a first region of said silicon structure, and a second end coupled to a second region of said silicon structure, said second region located generally diametrically opposed from said first region;

said second closed-ended vibratable structure including a first end coupled to a third region of said silicon structure, and a second end coupled to a fourth region of said silicon structure, said fourth region located generally diametrically opposed from said third region;

drive means, operative for energizing said first and second closed-ended vibratable structures to vibrate along an axis co-planar with and normal to said rotation sensitive axis, vibration of said first and second closed-ended vibratable structures effecting rotational movement of said silicon structure about said rotation sensitive axis upon the occurrence of angular rotation of said gyroscope about said first rotation sensitive axis; and means for sensing rotation of said silicon structure, and for providing a voltage output signal proportional to the rotational movement of said silicon structure, said voltage output signal providing an indication of angular rotation detected by said gyroscope.

31. The gyroscope of claim 30 further including rebalance means, responsive to said means for sensing, for counteracting and zeroing the rotational movement of said silicon structure about said rotation sensitive axis upon the occurrence and sensing of angular rotational of said gyroscope about said rotation sensitive axis.

32. A pivoting, monolithic, micromechanical tuning fork gyroscope, for detecting angular rotation about at least a first rotation sensitive axis, comprising:

a silicon substrate in which has been selectively etched a pit, and over which is suspended a silicon structure;

first and second flexible elements coupling said silicon structure to said substrate, and suspending said silicon structure over the selectively etched pit, each of said flexible elements integral with said substrate and said silicon structure, and disposed generally co-linear with said rotation sensitive axis, for allowing said silicon structure to rotate about said rotation sensitive axis;

said first flexible element including a first end coupled to a first region of said silicon substrate and a second end coupled to a first side of said silicon structure;

said second flexible element including a first end coupled to a second region of said silicon substrate diametrically opposed from said first region of said silicon substrate and said first flexible element, and a second end coupled to a second side of said silicon substrate;

said silicon structure including first and second segments, said first segment structurally coupled and electrically isolated from said second segment;

said silicon structure further including first and second closed-ended vibratable structures, said first and second closed-ended vibratable structures disposed generally parallel to one another, each of said first and second closed-ended vibratable structures including a central mass and, in line, resilient attachments to said silicon substrate integral with an associated vibratable structure;

said first closed-ended vibratable structure including a first end coupled to a first region of said first segment, and a second end coupled to a second region of said first segment, said second region located generally diametrically opposed from said first region;

said second closed-ended vibratable structure including a first end coupled to a first region of said second segment, and a second end coupled to a second region of said second segment, said second region located generally diametrically opposed from said first region;

drive means, operative for energizing said first and second closed-ended vibratable structures to vibrate along an axis coplanar with and normal to said rotation sensitive axis, vibration of said first and second closed-ended vibratable structures effecting rotational movement of said silicon structure about said rotation sensitive axis upon the occurrence of angular rotation of said gyroscope about said first rotation sensitive axis; and means for sensing rotation of said silicon structure, and for providing a voltage output signal proportional to the rotational movement of said silicon structure, for providing an indication of angular rotation detected by said gyroscope.

33. The gyroscope of claim 32 further including rebalance means, responsive to said means for sensing, for counteracting and zeroing the rotational movement of said silicon structure about said rotation sensitive axis upon the occurrence and sensing of angular rotational of said gyroscope about said rotation sensitive axis.

34. A monolithic, micromechanical tuning fork gyroscope, for detecting angular rotation about at least a first rotation sensitive axis, comprising:

a silicon substrate in which has been selectively etched a pit, and over which is suspended a silicon structure;

said silicon structure disposed within a first plane and including at least first and second, closed-ended vibratable structures, said first and second closed-ended vibratable structures disposed generally adjacent and parallel to one another;

first and second flexible elements coupling said silicon structure to said substrate, and suspending said silicon structure over the selectively etched pit, each of said flexible elements integral with said substrate and said silicon structure, and disposed generally co-linear and co-planar with said first rotation sensitive axis, for allowing said silicon structure to rotate about said first rotation sensitive axis;

said first flexible element including a first end coupled to a first region of said silicon substrate and a second end coupled to a first side of said silicon structure;

said second flexible element including a first end coupled to a second region of said silicon substrate diametrically opposed from said first region of said silicon substrate and said first flexible element, and a second end coupled to a second side of said silicon structure;

said silicon structure including first and second segments, said first segment structurally coupled and electrically isolated from said second segment by means of a dielectric isolation region;

said first closed-ended vibratable structure including a first resilient end coupled to a first region of said first segment, and a second resilient end coupled to a second region of said first segment, said second region located generally diametrically opposed from said first region;

said second closed-ended vibratable structure including a first resilient end coupled to a first region of said second segment, and a second resilient end coupled to a second region of said second segment, said second region located generally diametrically opposed from said first region;

drive means, for energizing said first and second closed-ended vibratable structures to vibrate laterally along an axis normal to said rotation sensitive axis and within said first plane, said lateral vibration of said first and second closed-ended vibratable structures effecting simultaneous vertical movement parallel to a second plane and normal to said first plane of at least a portion of said silicon structure upon the occurrence of angular rotation of said gyroscope about said first rotation sensitive axis;

wherein said drive means is operative for energizing said first and second closed-ended vibratable structures to vibrate laterally; co-planar with and along an axis normal to said first rotation sensitive axis, and vibrating of said first and second vibratable structures effecting rotational movement of said silicon structure about said rotation sensitive axis upon the occurrence of angular rotation of said gyroscope about said first rotation sensitive axis;

means for sensing said simultaneous vertical movement of said at least a portion of said silicon structure, and for providing a voltage output signal proportional to said sensed vertical movement, said voltage output signal providing an indication of angular rotation detected by said gyroscope; and wherein said means for sensing senses rotation of said silicon structure, for providing a voltage output signal proportional to the rotational movement of said silicon structure, said voltage output signal providing an indication of angular rotation detected by said gyroscope.

35. The gyroscope of claim 1 wherein each of said first and second closed-ended vibratable structures includes:

first and second support beams, each of said first and second support beams including a first end coupled to a first region of said silicon substrate, and a second end coupled to a first region of said mass; and third and fourth support beams, each of said third and fourth support beams including a first end coupled to a second region of said silicon substrate, and a second end coupled to a second region of said mass, said second region of said mass and said second region of said silicon substrate located generally diametrically opposed from said first region of said mass and said first region of said silicon substrate respectively.

36. The gyroscope of claim 35 wherein each of said support beams include first and second portions, said first portion proximate said first end and coupled to said silicon substrate; and said second portion disposed proximate said second end and coupled to said mass.

37. The gyroscope of claim 36 wherein each of said second portion of each of said support beams includes a height-to-width ratio which is greater than the height-to-width ratio of each of said first portions of each of said support beams.

38. The gyroscope of claim 37 wherein the height-to-width ratio of each of said first portion of each of said support beams is selected from the range of 0.1 to 1.

39. The gyroscope of claim 37 wherein the height-to-width ratio of each of said second portion of each of said support beams is selected from the range of 1–10.

* * * * *

UNITED STATES PATENT AND TRADEMARK OFFICE
CERTIFICATE OF CORRECTION

PATENT NO. : 5,505,084
DATED : April 9, 1996
INVENTOR(S) :
        Paul Greiff, et al.

It is certified that error appears in the above-indentified patent and that said Letters Patent is hereby corrected as shown below:

Column 10, line 45, "$\Sigma T = E_x 2 - E_x 2 + (E_{T1} - V_1)^2 + (E_{T2} - V_2)^2 - (E_{T2} - V_2)^2$", should read $-- \Sigma T = E_x 2 - E_x 2 + (E_{T1} - V_1)^2 - (E_{T1} - V_1)^2 + (E_{T2} - V_2)^2 - (E_{T2} - V_2)^2 --$.

Column 11, line 38, "Fig. 15. Wherein", should read --Fig. 15 wherein--.

Column 15, line 30, "said, first", should read --said first--.

Signed and Sealed this

Eighth Day of December, 1998

Attest:

BRUCE LEHMAN

*Attesting Officer*       *Commissioner of Patents and Trademarks*